US008417126B2

(12) United States Patent
Mandai et al.

(10) Patent No.: US 8,417,126 B2
(45) Date of Patent: Apr. 9, 2013

(54) POLARIZATION MULTIPLEXING TRANSMITTER AND TRANSMISSION SYSTEM

(75) Inventors: Kohei Mandai, Tokyo (JP); Nobuhiko Kikuchi, Tokyo (JP); Shinya Sasaki, Koganei (JP)

(73) Assignee: Hitachi, Ltd., Tokyo (JP)

( * ) Notice: Subject to any disclaimer, the term of this patent is extended or adjusted under 35 U.S.C. 154(b) by 276 days.

(21) Appl. No.: 12/985,455

(22) Filed: Jan. 6, 2011

(65) Prior Publication Data
US 2011/0170869 A1 Jul. 14, 2011

(30) Foreign Application Priority Data

Jan. 12, 2010 (JP) ................. 2010-004146

(51) Int. Cl.
*H04B 10/04* (2006.01)
(52) U.S. Cl. ........ 398/184; 398/183; 398/182; 398/152; 398/65
(58) Field of Classification Search .............. 398/65, 398/152, 182–186, 188
See application file for complete search history.

(56) References Cited

U.S. PATENT DOCUMENTS

| | | | | |
|---|---|---|---|---|
| 5,491,576 A | * | 2/1996 | Bergano | 398/185 |
| 6,671,464 B1 | * | 12/2003 | Kikuchi | 398/65 |
| 7,616,318 B2 | * | 11/2009 | Kikuchi | 356/450 |
| 7,742,699 B2 | * | 6/2010 | Calabro et al. | 398/65 |
| 8,073,338 B2 | * | 12/2011 | Buelow | 398/184 |
| 8,095,018 B2 | * | 1/2012 | Sekine et al. | 398/198 |
| 8,204,377 B2 | * | 6/2012 | Liu et al. | 398/65 |
| 8,234,538 B2 | * | 7/2012 | Djordjevic et al. | 714/755 |
| 8,249,467 B2 | * | 8/2012 | Roberts et al. | 398/205 |
| 8,265,489 B2 | * | 9/2012 | Kikuchi | 398/189 |
| 8,306,431 B2 | * | 11/2012 | Takahara | 398/152 |
| 2002/0093993 A1 | * | 7/2002 | LaGasse et al. | 370/536 |
| 2004/0081470 A1 | * | 4/2004 | Griffin | 398/188 |
| 2004/0125880 A1 | | 7/2004 | Emami et al. | |

(Continued)

FOREIGN PATENT DOCUMENTS

| | | |
|---|---|---|
| JP | 3375811 A | 11/2002 |
| JP | 2004-253931 A | 9/2004 |
| JP | 2005-260696 A | 9/2005 |
| JP | 2007-506291 A | 3/2007 |

OTHER PUBLICATIONS

E. Hu et al., 4-Level Direct-Detection Polarization Shift-Keying (DD-PolSK) System with Phase Modulators, OFC 2003, vol. 2, pp. 647-649.

*Primary Examiner* — Daniel Washburn
*Assistant Examiner* — Hibret Woldekidan
(74) *Attorney, Agent, or Firm* — Mattingly & Malur, PC

(57) ABSTRACT

A polarization multiplexing transmitter which generates polarization-multiplexed signals which are arbitrarily polarization-scrambled at high speed, without adding a polarization modulator and a polarization scrambler. In the transmitter, an orthogonally polarized signal generator includes two optical modulators which modulate the electric fields of optical signals and generate two optical signals with mutually orthogonal polarized waves. The transmitter includes electric field mappers which convert two data strings into electric field signals, polarization mappers which give different polarized waves to the two signals, polarization rotators which rotate the polarized waves of the signals uniformly, a polarization multiplexer which multiplexes the two polarization-rotated signals, a polarization demultiplexer which demultiplexes the multiplexed signal into polarized wave components of optical signals generated by the orthogonally polarized signal generator, and a driver. The optical modulators are driven to make the two demultiplexed electric field signals consistent with the electric fields of optical signals modulated by the modulators.

15 Claims, 18 Drawing Sheets

U.S. PATENT DOCUMENTS

| | | |
|---|---|---|
| 2004/0264592 A1 | 12/2004 | Sibecas et al. |
| 2009/0257755 A1* | 10/2009 | Buelow .......................... 398/184 |
| 2010/0086303 A1* | 4/2010 | Qian et al. ....................... 398/65 |
| 2011/0076019 A1* | 3/2011 | Rahn et al. ...................... 398/65 |
| 2011/0150498 A1* | 6/2011 | Meiman et al. ................. 398/152 |
| 2011/0217040 A1* | 9/2011 | Mori ................................ 398/53 |
| 2011/0236033 A1* | 9/2011 | Kikuchi ......................... 398/183 |
| 2011/0305454 A1* | 12/2011 | Hsieh .............................. 398/38 |

\* cited by examiner

*FIG. 1A*
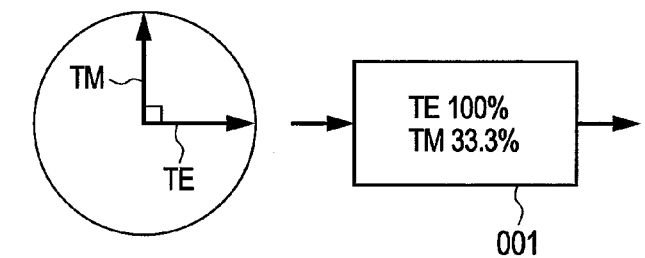
POLARIZATION
MULTIPLEXED SIGNAL
*FIG. 1B*
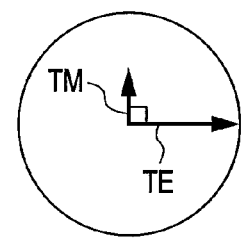
45° ROTATION
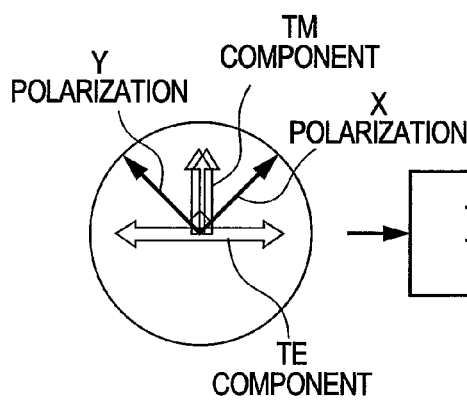
*FIG. 1C*
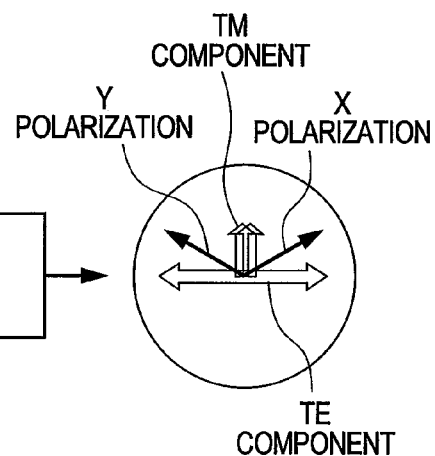
*FIG. 1D*

QPSK

9QAM

POLARIZATION MULTIPLEXING TRANSMITTER AND TRANSMISSION SYSTEM

CLAIM OF PRIORITY

The present application claims priority from Japanese patent application JP 2010-004146 filed on Jan. 12, 2010, the content of which is hereby incorporated by reference into this application.

FIELD OF THE INVENTION

The present invention relates to polarization multiplexing transmitters and transmission systems and more particularly to polarization multiplexing transmitters and transmission systems which output polarization-scrambled optical signals or particularly polarization-scrambled optical polarization-multiplexed signals.

BACKGROUND OF THE INVENTION

In recent optical transmission systems, the capacity of transmission is increased by multilevel modulation. Multilevel modulation is a technique which increases the capacity of transmission depending on the number of modulation levels by modulating the amplitude and/or phase of an optical signal into multiple levels. However, as the number of modulation levels increases, the receiver sensitivity worsens, resulting in a shorter transmission distance.

Therefore, next-generation optical transmission systems are expected to increase the capacity of transmission by using not only a multilevel modulation technique but also a polarization multiplexing technique. Polarization multiplexing is a technique which combines optical signals with different polarized waves (planes in which light waves vibrate) to increase the capacity of transmission. Usually, two optical signals whose polarized waves are orthogonal to each other are combined to double the capacity of transmission. A polarization multiplexing technique that uses two optical signals with mutually orthogonal polarized waves is called orthogonal polarization multiplexing. As described above, the use of polarization techniques is attractive for next-generation large-capacity optical transmission systems.

On the other hand, it is known that polarization causes various problems related to signal degradation. For example, polarization dependent loss (PDL) in optical waveguides, polarization dependent gain (PDG) in optical amplifiers, and polarization hole burning (PHB) give loss or gain to an optical signal depending on its polarization. Furthermore, polarization mode dispersion (PMD) in optical fibers or optical waveguides causes a delay in an optical signal depending on its polarization.

The polarization dependence of an optical fiber is attributable to the fact that stress on the optical fiber deforms its core cross section. Such cross-sectional deformation of the core not only causes polarization mode dispersion but also changes the polarized wave of the optical signal depending on its wavelength and polarization. Also, it is known that since generally the stress on the optical fiber is changing, the polarization dependence of the optical fiber also changes with time.

These phenomena caused by polarization can seriously deteriorate polarization multiplexed signal generated by polarization multiplexing. For example, PDL causes different losses in multiplexed signals for polarization multiplexed signal and also changes the polarization state between multiplexed signals. This phenomenon is explained below referring to FIGS. 1A to 1D. Let's suppose that a PDL device 001 transmits 100% of optical power of a horizontally vibrating TE polarization and 33.3% of a vertically vibrating TM polarization. When polarization multiplexed signal as shown in FIG. 1A which combines an optical signal with a TE polarization and one with a TM polarization enters the PDL device 001, there is a difference in light intensity between the two multiplexed polarized waves as shown in FIG. 1B. In this case, the polarization state between multiplexed signals is maintained. On the other hand, when polarization multiplexed signal as shown in FIG. 1C which combines an optical signal with a 45°-rotated X polarization and one with a 45°-rotated Y polarization enters the PDL device 001, the polarized waves of the two multiplexed signals rotate in opposite directions and the angle between the polarized waves changes from 90 degrees to 120 degrees as shown in FIG. 1D. This phenomenon can be interpreted to suggest that the X and Y polarizations as shown in FIG. 1C are both a combination of TE and TM polarizations and their TM polarization components are reduced by the PDL device 001 and consequently they both become closer to the TE polarization. In fact, when the PDL device 001 does not transmit the TM polarization, X and Y polarizations both become the TE polarization.

Polarization of an optical signal can be visualized by a Poincare sphere as shown in FIG. 2A. The Poincare sphere is a visualization tool which uniquely represents a polarized wave 009 as a point on a spherical surface. For example, FIG. 2A shows TE polarization 00A, TM polarization 00B, +45° polarized wave 00C, −45° polarized wave 00D, right-handed circular polarized wave 00E, and left-handed circular polarized wave 00F on the Poincare sphere. The line connecting the TE polarization 00A and TM polarization 00B, the line connecting the +45° polarized wave 00C, and −45° polarized wave 00D, and the line connecting the right-handed circular polarized wave 00E and left-handed circular polarized wave 00F are called S1, S2, and S3 axes respectively, in which these axes cross perpendicularly at the center of the Poincare sphere. Polarized waves orthogonal to each other like the TE polarization 00A and TM polarization 00B are expressed by points located on opposite sides. Polarization dependence can be understood to be a property that loss or delay varies depending on the position of a point on the Poincare sphere.

Polarization scrambling is known as a technique to suppress signal degradation caused by polarization dependence. Polarization scrambling is a technique to change the polarization of an optical signal in order to prevent the polarized wave of the signal from being fixed in a certain state. Therefore, the polarized wave of a polarization-scrambled optical signal has a temporal distribution 00H-1 as shown in FIG. 2B. Ideally, the polarization of the optical signal should be changed so that the optical signal polarized waves appear uniformly in a distribution 00H-2 covering the whole Poincare sphere as shown in FIG. 2C. Consequently the polarization dependence of the optical signal is averaged, thereby suppressing signal degradation caused by polarization dependence. Also, as for mutually orthogonal polarized waves, their polarization dependences are generally reverse, so it is effective to use a polarization scrambler which rotates the waves cyclically on a circumference with an axis passing through the center of the Poincare sphere as the axis of rotation (for example, distribution 00H-3 shown in FIG. 2D).

FIG. 3 shows a typical form of an optical transmission system which uses a polarization scrambling technique. In this system, an optical modulator (Mod) 003 modulates continuous light coming from a laser light source (LD) 002 according to transmission data and outputs it as an optical transmission signal. The polarized wave of the optical transmission signal is constant. The optical transmission signal enters a polarization scrambler (PS) 004 in which the polarized wave of the signal is temporally rotated. This polarized wave rotation process is called polarization scrambling. The optical transmission signal polarization-scrambled by the polarization scrambler 004 enters an optical fiber transmission path 005. Several optical repeaters (Nodes) 006 are inserted midway in the optical fiber transmission path 005 so as to compensate for signal degradation caused by loss or wavelength dispersion in the optical fiber transmission path 005. In some cases, an optical repeater 006 has a polarization scrambler 004. Then, the optical transmission signal which has entered the optical fiber transmission path 005 passes through the path 005 before it is received by an optical receiver (Rx) 008. The optical receiver 008 demodulates the transmission data in the received optical signal. If the polarization of the optical signal which the optical receiver 008 receives is to be limited, a polarization tracer (Pol. Tracer) 007 is inserted just before the optical receiver 008 to eliminate a fluctuation in the polarization of the optical signal so as to make the polarized wave of the optical signal suitable for the optical receiver 008 in advance. Some types of optical receiver 008 do not require an external polarization tracer 007 since they incorporate a polarization tracing function.

The optical fiber transmission path 005 and optical repeater 006 have different types of polarization dependence because they include an optical fiber, optical amplifier or optical waveguide type device. Since the influence of such polarization dependence depends on the polarization of the optical signal, if the polarization of the optical signal is unchanged, a state in which signal degradation due to polarization dependence is maximized may continue. Since polarization scrambling of the optical transmission signal by the polarization scrambler 004 changes the polarization of the optical signal, the influence of polarization dependence of the optical fiber transmission path 005 can be averaged. This effect can be enhanced when an error correction technique such as forward error correction (FEC) is combined with polarization scrambling. For example, FEC is a technique which divides the optical transmission signal into FEC frames of several microseconds before transmission and corrects an error of the received signal on a frame-by-frame basis. If the optical signal is polarization-scrambled at a much higher speed (for example, 10 MHz or more) than the FEC frame length, an error in the received signal at the moment when the polarization of the optical signal becomes the worst can be corrected using a received signal at another time for the optical fiber transmission path 005 or optical repeater 006. Also, since response to change in the polarization of the optical signal is slow, at least PDG or PHB can be suppressed by polarization scrambling at a much higher speed (for example, 100 kHz or more) than the response speed.

Thus, polarization scrambling is an effective technique for suppression of signal degradation caused by polarization dependence. As described above, it is desirable to perform polarization scrambling at high speed e. It is reported that signal degradation is more effectively suppressed when polarization scrambling is synchronized with data modulation and the polarization scrambling speed is made equal to the data modulation speed, as described in Japanese Patent No. 3375811.

However, an ordinary polarization scrambler mechanically drives its internal devices, so its polarization rotation speed is in the range from several kilohertz to several megahertz. Not many polarization scramblers are able to rotate polarized waves at higher speed with accuracy, though electro-optical polarization scramblers are known to be able to rotate polarized waves at a speed of 10 MHz or more.

A typical electro-optical polarization scrambler is a polarization modulator which modulates the phase difference between two mutually orthogonal TE and TM polarizations using an optical phase modulator. This polarization modulator can rotate polarized waves on a circumference 00H-4 (FIG. 4A) with the S1 axis as the axis of rotation on the Poincare sphere. The circumference 00H-4 includes a circumference 00G-3 which passes through +45° polarized wave 00C, and right-handed circular polarized wave 00E, in which the +45° polarized wave 00C, and right-handed circular polarized wave 00E can be converted into each other. However, TE polarization 00A and TM polarization 00B cannot be converted at all. Another problem is that even the +45° polarized wave 00C, and right-handed circular polarized wave 00E cannot be converted, for example, into TE polarization 00A.

In this connection, a non-patent document authored by E. Hu et al. and entitled "4-Level Direct-Detection Polarization Shift-Keying (DD-PolSK) System with Phase Modulators" (OFC, FD2, 2003) reports a polarization modulator which modulates the amplitude ratio and phase difference between mutually orthogonal TE polarization 00A and TM polarization 00B. This polarization modulator simulates polarization rotation on a circumference 00H-5 (FIG. 4B) with the S3 axis as the axis of rotation on the Poincare sphere by varying the amplitude ratio between the TE polarization 00A component and TM polarization 00B component of an incoming optical signal. Here, it is also possible to output an optical signal with a desired polarized wave by modulating the phase difference between the TE polarization 00A component and TM polarization 00B component in addition to polarization rotation with the S1 axis as the axis of rotation. However, an optical signal entering the polarization modulator must have a TE polarization 00A component and a TM polarization 00B component. The polarization of an incoming signal with TE polarization 00A component and TM polarization 00B component cannot be converted arbitrarily. Desirably the incoming polarized wave should be a +45° polarized wave 00C, equally having the TE polarization 00A component and TM polarization 00B component.

SUMMARY OF THE INVENTION

In an optical transmission system, generally the polarized wave of an optical signal at the output end of the optical modulator 003 is fixed so if a polarization rotator is installed there, the polarized wave can be converted into a +45° polarized wave 00C, and fixed. Therefore, if the above polarization modulator is installed just after the polarization rotator, the polarized wave of the optical transmission signal can be changed arbitrarily. This kind of technique is described, for example, in JP-A-2005-260696.

In any case, for polarization scrambling of an optical signal, it is necessary to add a polarization modulator and its control circuit to the optical transmitter, posing a problem of increase in equipment size and cost. This problem is particularly serious for a transmission system which uses many optical transmitters, such as a wavelength demultiplexing/multiplexing (WDM) transmission system. As a solution to this problem, JP-A-2004-253931 proposes a technique which integrates polarization modulators for plural wavelength channels into one unit in a WDM transmission system by installing, before a polarization modulator, means to convert polarized waves into linearly polarizations such as TE and TM polarizations. However, this technique also has a problem that the polarization modulator must have a complicated structure and cannot be used for polarization multiplexing.

In the field of wireless communications, JP-T-2007-506291 suggests a technique which modulates two electric fields with mutually orthogonal polarized waves adequately to generate a transmission signal with an arbitrary polarization. This technique can be used to let the polarized wave of a transmission signal hop according to transmission data or multiplex arbitrarily polarized transmission signals.

This technique, an invention for wireless communications, has no idea of polarization scrambling though it has an idea of polarized wave hopping. The reason is that the polarization dependence of transmission paths is small in wireless communications. In order to enable polarization scrambling of an optical signal, along with the adoption of the idea proposed in this patent document for an optical transmission system, an optical signal polarization scrambling mechanism suitable for the optical transmission system must be added. Particularly, a mechanism for polarization scrambling of polarization-multiplexed signals is anticipated in prospect of next-generation large-capacity optical transmission systems.

An object of the present invention is to provide a polarization scrambling optical transmitter which generates polarization-scrambled modulated signals, particularly polarization-multiplexed signals without newly adding a polarization modulator and a polarization scrambler.

According to a first aspect of the invention, there is provided a polarization multiplexing transmitter which includes:

an orthogonal polarization multiplexing transmitter including an orthogonally polarized signal generator which generates two transmission electric fields with mutually orthogonal polarized waves, two electric field modulators which modulate amplitudes and/or phases of the two transmission electric fields respectively, and a polarization multiplexer which multiplexes two transmission electric fields modulated by the two electric field modulators and outputs a single polarization-multiplexed signal; and an electric field modulator driver which converts plural data strings into plural electric field signals, coverts the electric field signals into polarized electric field signals with arbitrary different polarized waves, rotates the polarized waves of the polarized electric field signals on a Poincare sphere, demultiplexes the polarized electric field signal into electric field signals with two polarized wave components consistent with the polarized waves of the two transmission electric fields generated by the orthogonally polarized signal generator, and drives the two electric field modulators based on the electric field signals respectively.

According to a second aspect of the invention, there is provided a polarization multiplexing transmitter which includes:

an orthogonal polarization multiplexing transmitter having an orthogonally polarized signal generator which generates two optical signals with mutually orthogonal polarized waves, two optical modulators which modulate the amplitudes and/or phases of the two optical signals, and a polarization multiplexer which multiplexes two optical signals modulated by the two optical modulators and outputs a single polarization multiplexed signal; and an optical modulator driver having plural electric field mappers, with a function to convert data into electric fields uniquely, which convert plural data strings into electric field signals respectively, plural polarization mappers, with a function to convert an incoming electric field into an arbitrary polarization having that electric field, which convert the plural electric field signals from the plural electric field mappers into polarized electric field signals with different desired polarized waves respectively, a polarization multiplexer which multiplexes the plural polarized electric field signals and generates a multiplexed polarized electric field signal, a polarization demultiplexer which demultiplexes the multiplexed polarization electric field signal into electric field signals with two polarized wave components consistent with the two optical signals generated by the orthogonally polarized signal generator, and two drive signal generators which drive the two optical modulators so that the electric field signals with two polarized wave components from the polarization demultiplexer are consistent with the electric fields of the optical signals coming from the two optical modulators.

According to a third aspect of the invention, there is provided a polarization multiplexing transmitter which includes:

an orthogonal polarization multiplexing transmitter having an orthogonally polarized signal generator which generates two transmission electric fields with mutually orthogonal polarized waves, two electric field modulators which modulate the amplitudes and/or phases of the two transmission electric fields, and a polarization multiplexer which multiplexes two transmission electric fields from the orthogonally polarized signal generator and outputs a single polarization-multiplexed signal, in which the orthogonally polarized signal generator includes two polarization electric field modulators which further modulate the amplitudes and/or phases of the two transmission electric fields modulated by the two electric field modulators and a polarization electric field modulator driver which drives the two polarization electric field modulators so as to modulate the amplitude ratio and/or phase difference between the transmission electric fields modulated by the two electric field modulators; and plural electric field mappers, with a function to convert data into electric fields uniquely, which convert plural data strings into electric field signals respectively, polarization mappers, with a function to convert an incoming electric field into an arbitrary polarization having that electric field, which convert the plural electric field signals into plural polarized electric field signals with different polarized waves as arbitrary polarizations on a circumference of a circle with a line connecting the polarized waves of the two transmission electric fields as the axis of rotation on the Poincare sphere, a polarization multiplexer which multiplexes the polarized electric field signals into a multiplexed polarized electric field signal, a polarization demultiplexer which demultiplexes the multiplexed polarized electric field signal into electric field signals with two polarized wave components consistent with the polarized waves of the two transmission electric fields, and two drive signal generators which drive the two electric field modulators respectively so that the electric field signals with two polarized wave components from the polarization demultiplexer are consistent with the two transmission electric fields modulated by the two electric field modulators.

According to a fourth aspect of the invention, there is provided a polarization multiplexing transmitter which includes:

an orthogonal polarization multiplexing transmitter having an orthogonally polarized signal generator which generates two transmission electric fields with mutually orthogonal polarized waves, two electric field modulators which modulate the amplitudes and/or phases of the two transmission electric fields, and a polarization multiplexer which multiplexes two transmission electric fields emitted from the orthogonally polarized signal generator and outputs a single polarization-multiplexed signal; and an electric field modulator driver having two electric field mappers, with a function to convert data into electric fields uniquely, which convert two data strings into electric field signals respectively, an electric field phase modulator which modulates either or both of the two electric field signals to modulate the phase difference between the two electric field signals, and two drive signal generators which drive the two electric field modulators respectively so that the two electric field signals modulated by the electric field phase modulator are consistent with the transmission electric fields modulated by the two electric field modulators.

According to a fifth aspect of the invention, there is provided a polarization multiplexing transmitter which includes:

an orthogonal polarization multiplexing transmitter having an orthogonally polarized signal generator which generates two transmission electric fields with mutually orthogonal polarized waves, two electric field modulators which modulate the amplitudes and/or phases of the two transmission electric fields respectively, and a polarization multiplexer which multiplexes two transmission electric fields modulated by the two electric field modulators and outputs a single polarization-multiplexed signal; and an electric field modulator driver having a data string alternation device which alternates two incoming data strings cyclically and outputs two alternate data strings, two electric field mappers, with a function to convert data into electric fields uniquely, which convert the two alternate data strings into electric field signals, and two drive signal generators which drive the two electric field modulators respectively so that the two electric field signals from the electric field mappers are consistent with the electric fields modulated by the electric field modulators.

According to a sixth aspect of the invention, there is provided a polarization multiplexing transmitter which includes:

an orthogonal polarization multiplexing transmitter having an orthogonally polarized signal generator which generates two transmission electric fields with mutually orthogonal polarized waves, two electric field modulators which modulate the amplitudes and/or phases of the two transmission electric fields respectively, and a polarization multiplexer which multiplexes two transmission electric fields modulated by the two electric field modulators and outputs a single polarization-multiplexed signal; and an electric field modulator driver having two electric field mappers, with a function to convert data into electric fields uniquely, which convert two incoming data strings into electric field signals respectively, an electric field signal alternation device which alternates two incoming electric field signals cyclically and outputs two alternate electric field signals, and two drive signal generators which drive the two electric field modulators respectively so that two alternate electric field signals from the electric field signal alternation device are consistent with transmission electric fields modulated by the two electric field modulators.

According to a seventh aspect of the invention, there is provided a polarization multiplexing transmitter which includes:

an orthogonal polarization multiplexing transmitter having an orthogonally polarized signal generator which generates two optical signals with mutually orthogonal polarized waves, two optical modulators which modulate the amplitudes and/or phases of the two optical signals, and a polarization multiplexer which multiplexes the two optical signals from the two optical modulators and outputs a single polarization multiplexed signal;

an optical modulator driver having two electric field mappers, with a function to convert data into electric fields uniquely, which convert two data strings into electric field signals respectively and two drive signal generators which drive the two optical modulators respectively so that the two electric field signals are consistent with the electric fields of two optical signals from the two optical modulators;

a polarization modulator which modulates a phase difference between two mutually orthogonal polarized wave components on a circumference of a circle perpendicular to a line connecting two polarized waves from the orthogonal polarization multiplexing transmitter on a Poincare sphere and having the center of the Poincare sphere in its plane, and a driver which drives the polarization modulator.

According to an eighth aspect of the invention, there is provided a polarization multiplexing transmitter which includes:

an orthogonal polarization multiplexing transmitter having an orthogonally polarized signal generator which generates two optical signals with mutually orthogonal polarized waves, two optical modulators which modulate the amplitudes and/or phases of the two optical signals, two polarization modulators which modulate the polarized waves of the two optical signals respectively, and a polarization multiplexer which multiplexes two optical signals modulated by the optical modulators and polarization modulators and outputs a single polarization multiplexed signal;

an optical modulator driver having two electric field mappers, with a function to convert data into electric fields uniquely, which convert two data strings into electric field signals respectively and two drive signal generators which drive the two optical modulators so that the two electric field signals are consistent with the electric fields of two optical signals from the two optical modulators; and a polarization modulator driver which drives the two polarization modulators so that the angle between the polarized waves of output signals from the two polarization modulators is maintained constant and the polarized waves of the output signals from the two polarization modulators are modulated uniformly.

According to a ninth aspect of the invention, there is provided a transmission system which includes a polarization multiplexing transmitter of any of the above types;

a transmission path polarization monitor which detects a polarization fluctuation in a transmission path from the polarization multiplexing transmitter to a receiver or its residual, or the amount of dependence thereon; and a polarization management device which drives the polarization multiplexing transmitter based on the result of detection by the transmission path polarization monitor, in which the polarization multiplexing transmitter outputs a polarization-multiplexed signal with a polarized wave so rotated as to cancel a polarization fluctuation in the transmission path.

According to a tenth aspect of the invention, there is provided a transmission system which includes:

a plurality of polarization multiplexing transmitters of any of the above types and a plurality of polarization-uncontrolled transmitters which output a non-polarization scrambled transmission signal, in which the polarization multiplexing transmitters and the polarization-uncontrolled transmitters include:

a transmitting module with different wavelength channels, a multiplexer which multiplexes transmission signals from the polarization multiplexing transmitters and polarization-uncontrolled transmitters and transmits the multiplexed signal to a transmission path, and a polarization scrambling management device which controls the polarization scrambling patterns and/or speeds of the polarization multiplexing transmitters so that the polarization scrambling patterns and/or speeds of the polarization multiplexing transmitters with adjacent wavelength channels do not coincide with each other.

According to the present invention, using an orthogonal polarization multiplexing transmitter, a polarization-scrambled optical signal can be generated without newly adding a polarization modulator or polarization scrambler to a transmitter. In particular, polarization-scrambled polarization multiplexed signal can be generated. In addition, according to the invention, since neither additional polarization modulator nor polarization scrambler is required, the equipment cost and size can be reduced.

Furthermore, according to the invention, the polarization scrambling speed and/or pattern, cycle and timing of an optical signal emitted from an optical transmitter can be as desired. Particularly, the polarization scrambling speed can be a desired speed not higher than the modulation speed of the optical signal.

BRIEF DESCRIPTION OF THE DRAWINGS

FIGS. 1A to 1D illustrate the phenomenon of signal degradation due to PDL, in which FIG. 1A shows polarization-multiplexed light, FIG. 1C shows a multiplexed optical signal with X and Y polarizations rotated 45 degrees, and FIG. 1D shows change in the angle between the polarized waves;

FIGS. 2A to 2D illustrate a Poincare sphere, in which FIG. 2A shows different polarized waves on a Poincare sphere, FIG. 2B shows a polarization-scrambled optical signal, FIG. 2C shows uniformly distributed polarized waves, and FIG. 2D shows a circumference for periodic rotation of polarized waves;

FIGS. 4A to 4C illustrate operation of a polarization modulator, in which FIG. 4A shows circumferences of the Poincare sphere for polarization rotation, FIG. 4B shows polarization rotation with an axis of rotation, and FIG. 4C shows polarization rotation with another axis of rotation;

FIGS. 6A and 6B illustrate field mapping by QPSK, in which FIG. 6A shows conversion of data strings into electric field signals and FIG. 6B shows nine field symbols by quadrature amplitude modulation;

DETAILED DESCRIPTION OF THE PREFERRED EMBODIMENTS

The preferred embodiments of the present invention use an orthogonal polarization multiplexing transmitter which generates polarization multiplexed signal.

Figure 5:
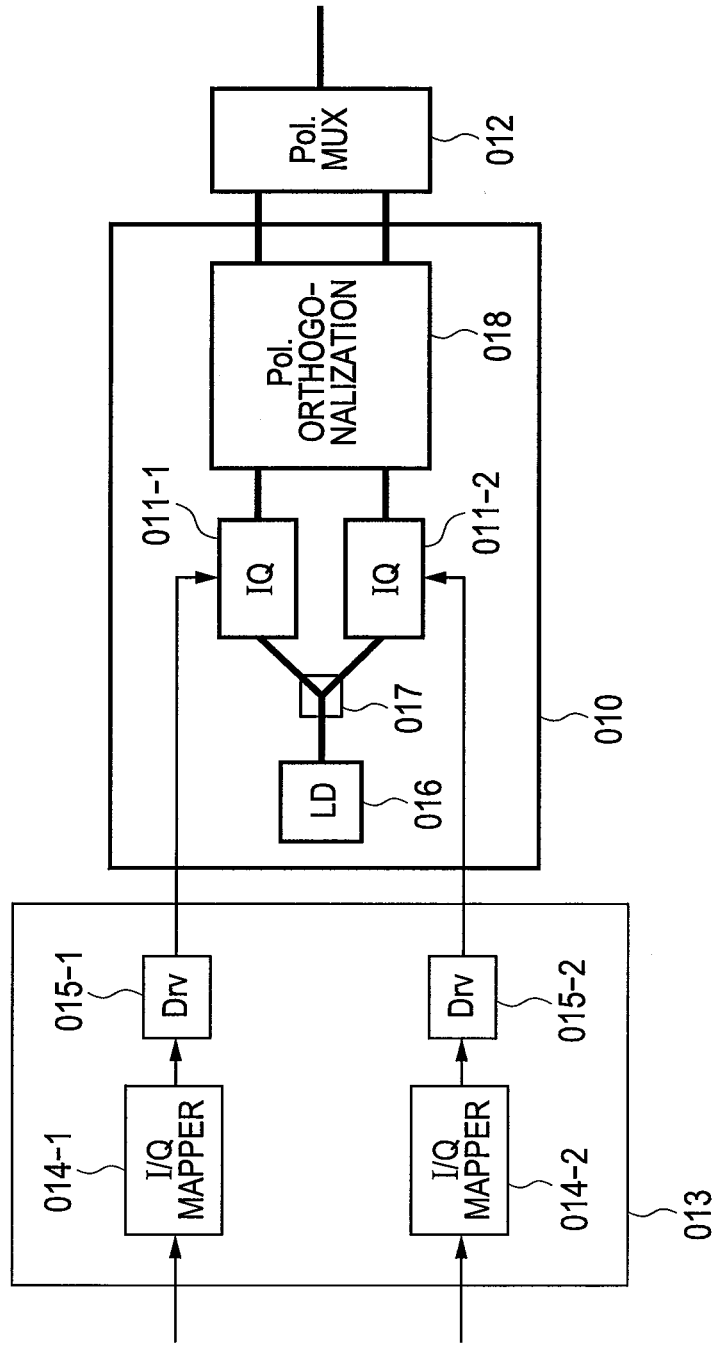
FIG. 5 shows the configuration of an orthogonal polarization multiplexing transmitter.

FIG. 5 shows an example of the configuration of an orthogonal polarization multiplexing transmitter.

The orthogonal polarization multiplexing transmitter has an orthogonally polarized signal generator 010, a polarization multiplexer 012, and a modulator driver 013. The orthogonally polarized signal generator 010 outputs two optical signals which have polarized waves orthogonal to each other. The orthogonally polarized signal generator 010 has two optical modulators 011-1 and 011-2 which modulate the amplitudes and/or phases of the optical signals with mutually orthogonal polarized waves respectively. The polarization multiplexer 012 multiplexes or combines the two polarized optical signals emitted from the optical modulators 011-1 and 011-2 and outputs the multiplexed signal as polarization multiplexed signal. The modulator driver 013 drives the two optical modulators 011-1 and 011-2.

The orthogonally polarized signal generator 010 includes: a laser light source 016 which outputs continuous light; an optical splitter 017 which bifurcates the continuous light into two optical waveguides; two optical modulators 011-1 and 011-2 which modulate the amplitudes and/or phases of the two continuous lights coming from the optical splitter 017 respectively; and a polarization orthogonalizer 018 which rotates one or both of the polarized waves of the two optical signals modulated by the optical modulators 011-1 and 011-2 and orthogonalizes the polarized waves. The polarized orthogonalizer 018 is embodied in the form of a wave plate, Faraday rotator or the like. However, the orthogonally polarized signal generator 010 is not limited to the above configuration and may employ any other appropriate means. An alternative configuration may be that the optical splitter 017 is replaced by a polarization rotator to rotate a polarized wave from the laser light source 016 to make it a +45° polarized wave and a polarization demultiplexer to divide an incoming optical signal into TE and TM polarizations and the polarization orthogonalizer 010 is omitted.

The modulator driver 013 converts two different data strings into electric field signals respectively using two electric field mappers 014-1 and 014-2 with a function to convert data into electric fields uniquely. Two drive signal generators 015-1 and 015-2 output drive signals to the optical modulators 011-1 and 011-2 respectively so that these electric field signals are consistent with the electric fields of the optical signals coming from the optical modulators 011-1 and 011-2. This is just an example of the configuration of the modulator driver 013 and any other configuration may be adopted as far as it can drive the optical modulators 011-1 and 011-2 according to transmission data.

Figure 6A:
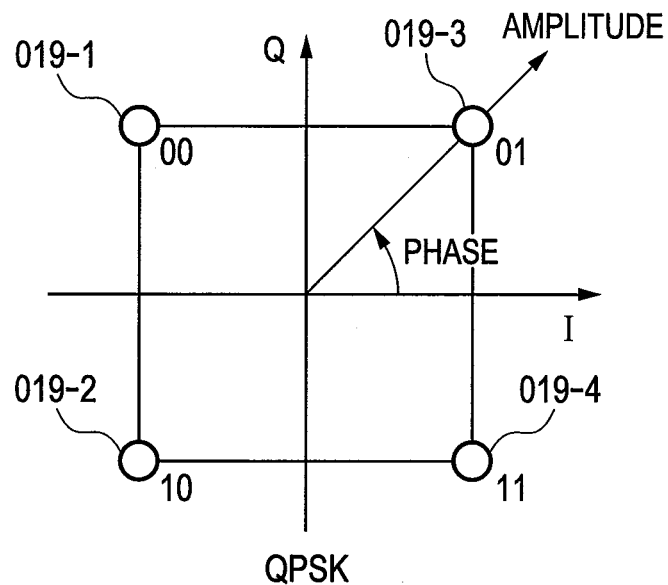

For the conversion of data and electric fields in the electric field mappers 014-1 and 014-2, various modulation methods for converting the amplitudes and/or phases of electric fields are available. For example, if the quadrature phase shift keying (QPSK) method is selected, electric field mapping as shown in FIG. 6A is applied in which 2-bit data 00, 01, 10, and 11 are converted into electric field symbols with different phases, 019-1, 019-2, 019-3, and 019-4.

Generally the optical modulators 011-1 and 011-2 used in this orthogonal polarization multiplexing transmitter are electro-optical modulators. Therefore, when the orthogonal polarization multiplexing transmitter is embodied in the following forms, polarized waves of output signals can be scrambled at high speed.

First Embodiment

As explained earlier, in an ordinary electro-optical polarization scrambler, not only polarizations which can be emitted but also the polarized wave of incoming light are limited. Polarization multiplexed signal from an orthogonal polarization multiplexing transmitter is a signal obtained by multiplexing different polarized waves and it is difficult to bring these polarized waves into a specific polarized state simultaneously.

Therefore, a possible approach is to limit the polarized waves of a multiplexed signal as polarization multiplexed signal to polarized waves which can be rotated by an electro-optical polarization scrambler. This will make polarization-scrambling of polarization multiplexed signal possible.

However, some kinds of polarized waves can be rotated most effectively by an electro-optical polarization scrambler. For example, a polarization scrambler having a polarization modulator which modulates the phase difference between two mutually orthogonal polarized waves (for example, +45° polarized wave 00C, and −45° polarized wave 00D) performs polarization rotation of the optical signal on a circumference (circumference 00H-6 in FIG. 4C in the example) having, as the axis of rotation, the line (S2 axis in the example) connecting the two polarized waves to be modulated, on the Poincare sphere. Although the electro-optical polarization scrambler cannot perform considerable polarization rotation of even incoming signals with polarized waves similar to the polarized waves to be modulated on the Poincare sphere (+45° polarized wave 00C, and −45° polarized wave 00D in the example), it can perform considerable polarization rotation on incoming signals with polarized waves whose coordinates are orthogonal to each other on the Poincare sphere (TE polarization 00A, TM polarization 00B, right-handed circular polarized wave 00E, and left-handed circular polarized wave 00F in the example).

Therefore, in this embodiment, the polarized waves of signals to be multiplexed by the orthogonal polarization multiplexing transmitter are polarized waves which an electro-optical polarization scrambler can rotate most effectively.

Figure 7:
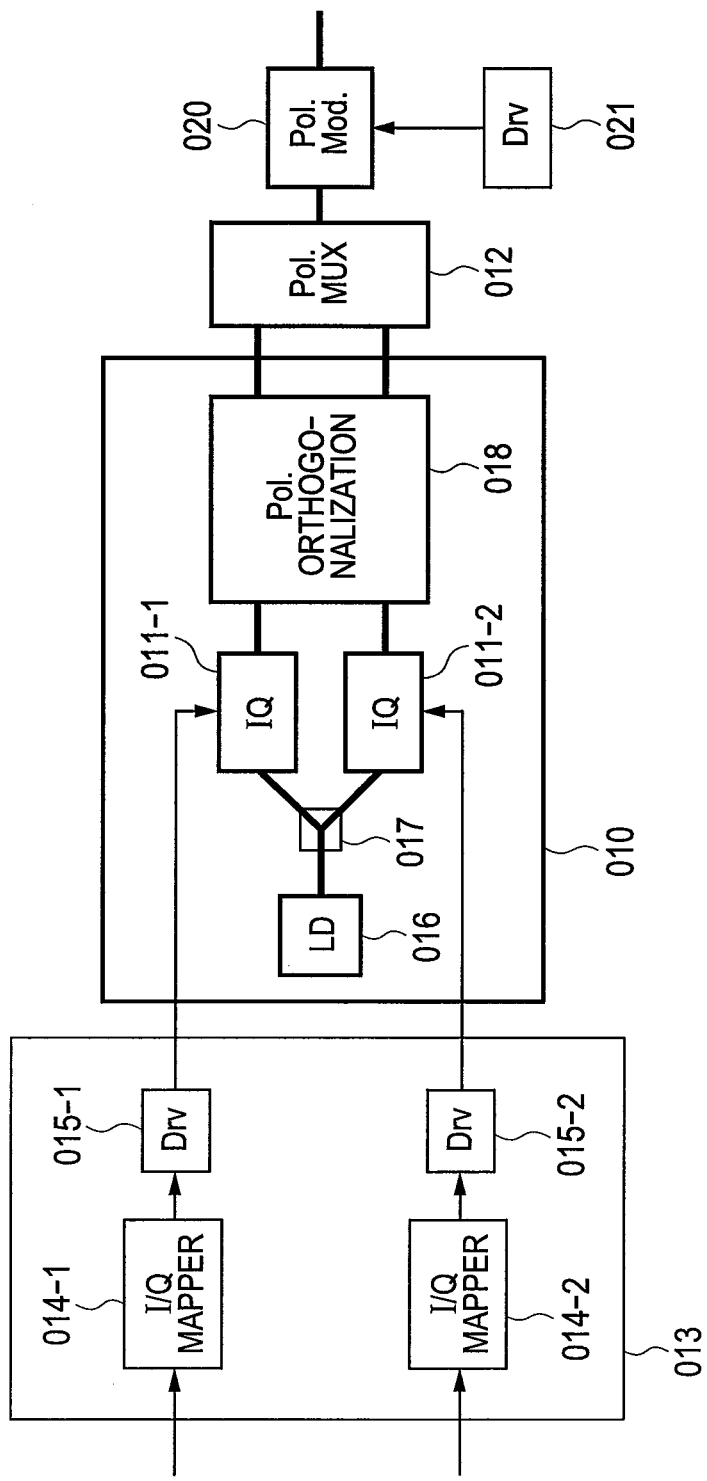
FIG. 7 shows an example of the configuration of a first embodiment of the invention.

FIG. 7 shows an example of the configuration of the polarization multiplexing optical transmitter according to the first embodiment.

The optical polarization multiplexing transmitter includes: an orthogonally polarized signal generator 010 which modulates the amplitudes and/or phases of optical signals with TE and TM polarizations according to two data strings respectively and output the modulated waves; a polarization multiplexer 012 which multiplexes the two optical signals emitted from the orthogonal polarization multiplexing transmitter 011 and outputs a single polarization multiplexed signal; a polarization modulator 020 which modulates the phase difference between the +45° polarized wave component and −45° polarized wave component of the polarization multiplexed signal; a polarization modulation driver 021 which generates a drive signal for the polarization modulator 020; and a modulator driver 013. In this specification, the orthogonally polarized signal generator 010 and polarization multiplexer 012 are sometimes collectively called an orthogonal polarization multiplexing transmitter.

The orthogonally polarized signal generator 010 may include: a laser light source 016 which emits continuous light with TE polarizations; an optical splitter 017 which bifurcates the continuous light; optical modulators 011-1 and 011-2 which modulate the amplitudes and/or phases of the two continuous lights coming from the optical splitter 017 respectively; and a polarization orthogonalizer 018 which converts the polarized waves of the optical signals coming from the optical modulators 011-1 and 011-2 into TE and TM polarizations.

The optical modulators 011-1 and 011-2 are driven by the modulator driver 013. The configuration of the modulator driver 013 is the same as that of the modulator driver 013 of the orthogonal polarization multiplexing transmitter shown in FIG. 5.

The polarization modulator 020 performs polarization rotation of the optical signal on circumference 00H-6 (FIG. 4C) having, as the axis of rotation, the S2 axis connecting the +45° polarized wave 00C, and −45° polarized wave 00D on the Poincare sphere. This polarization rotation largely changes the polarized waves on equator 00G-2 (FIG. 4C) with the S2 axis as the axis of rotation on the Poincare sphere. Thus, the TE polarization 00A and TM polarization 00B which are multiplexed by the orthogonal polarization multiplexing transmitter can be largely rotated. The polarized waves of signals multiplexed by the orthogonal polarization multiplexing transmitter should be polarized waves on the circumference 00G-2 (FIG. 4C) and may be a right-handed circular polarized wave 00E or left-handed circular polarized wave 00F. The optical polarization multiplexing transmitter thus configured emits polarization multiplexed signal which rotates uniformly on the circumference 00G-2 of the Poincare sphere (FIG. 4C).

Although in this example the polarization modulator which modulates the phase difference between two mutually orthogonal polarized wave components is used as an electro-optical polarization scrambler, it is also possible to use another type of polarization modulator. For example, if a polarization modulator which modulates the amplitude ratio between TE and TM polarizations is used as the polarization modulator 020, the polarized waves of signals which are multiplexed by the polarization multiplexing transmitter 010 should be polarized waves on the circumference 00G-3 (FIG. 4A), for example, +45° polarized waves. The reason is that if the polarization modulator 020 converts an optical signal with a small TM polarization component into a TM polarization, the intensity of output light is low, so desirably incoming light should have a TM polarization component and a TE polarization component equally.

In this example, polarization multiplexed signal with various polarized waves can be polarization-scrambled by varying the combination of polarized waves multiplexed by the polarization multiplexing transmitter 010 and polarized waves modulated by the polarization modulator 020.

Second Embodiment

If optical signals are not polarization-multiplexed yet, the polarized waves of the optical signals can be converted into polarized waves suitable for an electro-optical polarization scrambler. Thus, polarization-scrambled polarization multiplexed signal can be generated by multiplexing the polarized waves of the optical signals after they are modulated by an electro-optical polarization scrambler.

Figure 8:
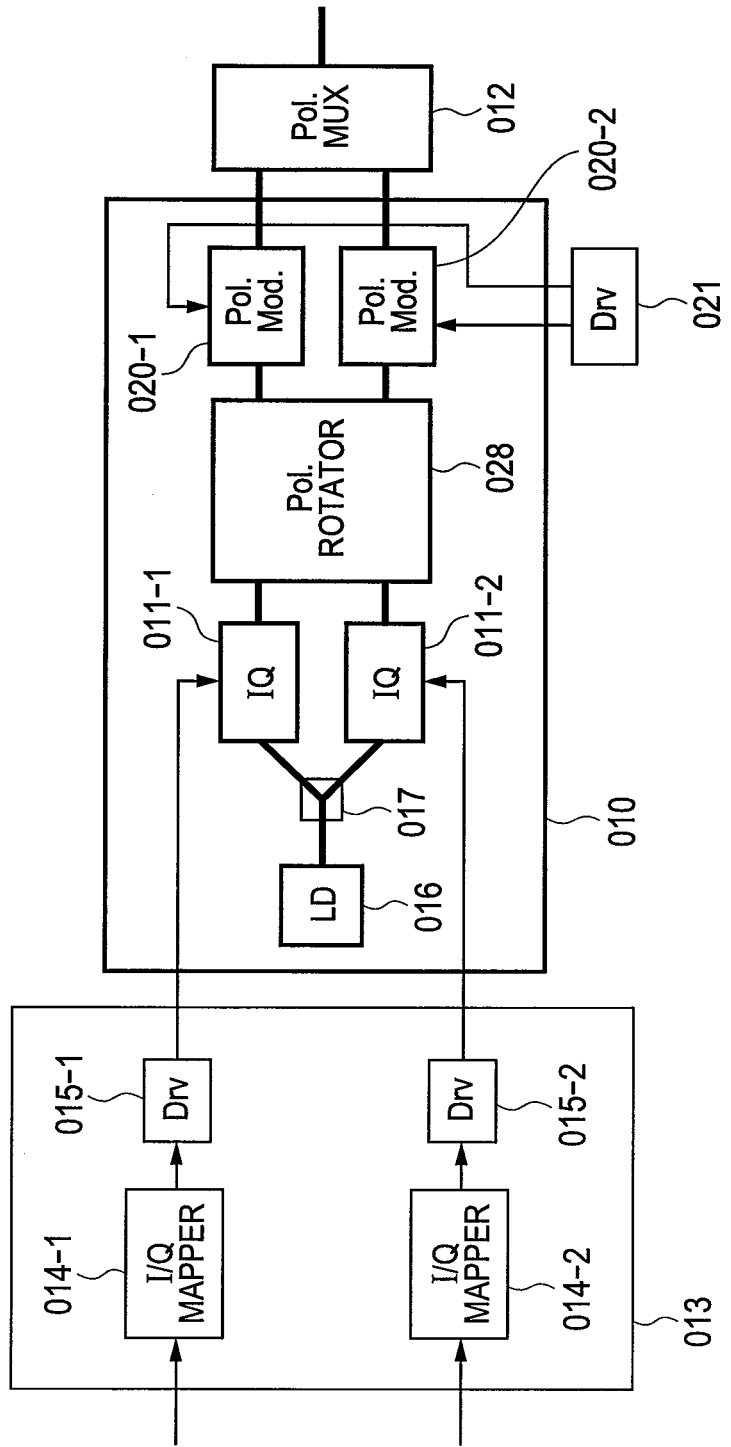
FIG. 8 shows an example of the configuration of a second embodiment of the invention.

FIG. 8 shows an example of the configuration of the second embodiment.

The optical polarization multiplexing transmitter includes: an orthogonally polarized signal generator 010 which modulates and outputs the polarized waves and amplitudes and/or phases of two optical signals; a polarization multiplexer 012 which multiplexes the two optical signals coming from the orthogonally multiplexed signal generator 010 and outputs polarization multiplexed signal; a modulator driver 013; and a polarization modulation driver 021.

The orthogonally polarized signal generator 010 may include: a laser light source 016 which emits continuous light with TE polarizations; an optical splitter 017 which bifurcates the continuous light; optical modulators 011-1 and 011-2 which modulate the amplitudes and/or phases of the two continuous lights coming from the optical splitter 017 respectively; two polarization rotators 028 which convert the polarized waves of the optical signals coming from the optical modulators 011-1 and 011-2 into, for example, +45° polarized waves respectively; and two polarization modulators 020-1 and 020-2 which modulate the phase difference and/or amplitude ratio between the TE and TM polarization components of each of the optical signals coming from the two polarization rotators 028.

The optical modulators 011-1 and 011-2 are driven by the modulator driver 013. The configuration of the modulator driver 013 is the same as that of the modulator driver 013 of the orthogonal polarization multiplexing transmitter shown in FIG. 5.

The two polarization modulators 020-1 and 020-2 are driven by the polarization modulation driver 021 and their output polarized waves are controlled. For example, if polarization multiplexed signal from the polarization multiplexer 012 is to be an orthogonally polarized multiplexed signal, the two polarization modulators 020-1 and 020-2 are driven so that their output polarized waves become orthogonal to each other. Also, if optical signals from the optical modulators 011-1 and 011-2 are to be multiplexed with different polarized waves and the resulting polarization-multiplexed signal light is to be polarization-scrambled and emitted, the polarization modulators 020-1 and 020-2 are driven so that the output polarized waves from the polarization modulators 020-1 and 020-2 are different from each other and while their relation is maintained, they rotate uniformly on the Poincare sphere.

Figure 2A:
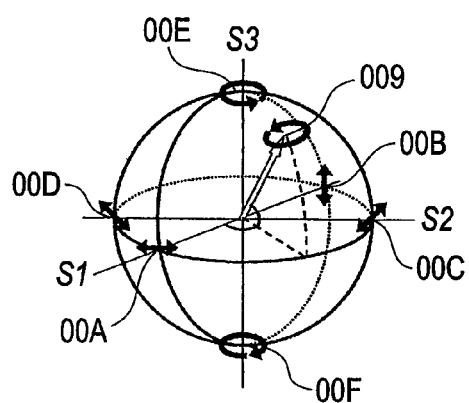
Figure 2B:
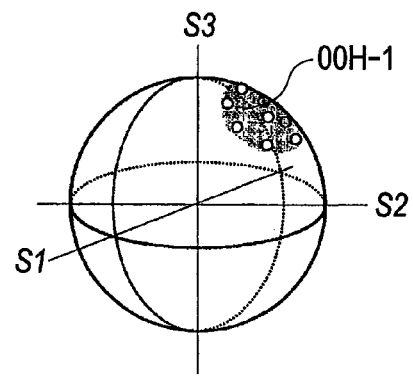
FIG. 2B shows a light intensity difference between the polarized waves of the light.
Figure 2C:
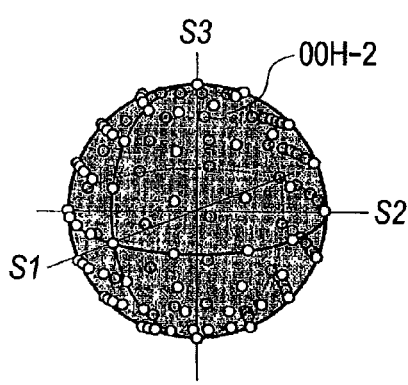
Figure 2D:
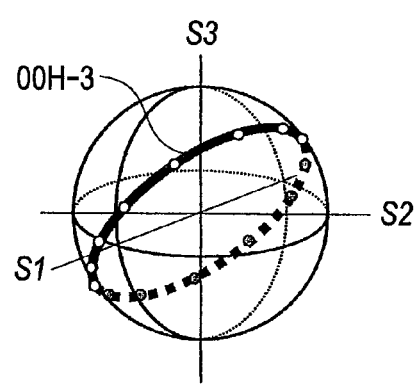
Figure 3:
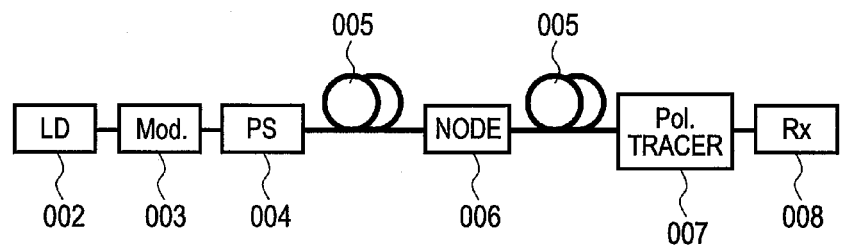
FIG. 3 schematically shows an optical transmission system which uses a polarization scrambling technique on the transmitting side.

For the polarization modulators 020-1 and 020-2, various types of electro-optical polarization modulators are available. For example, the electro-optical polarization scrambler described earlier in the section of the Background of the Invention may be used. By using a polarization modulator capable of converting the polarized waves of output signals arbitrarily, it is also possible to generate an optical signal whose polarized wave changes uniformly all over the Poincare sphere. The optical signal polarization distribution generated in this case is shown as distribution 00H-2 in FIG. 2C.

Although optical signals with two different polarized waves are multiplexed in this example, it is also possible to multiplex more than two polarized optical signals. It should be however noted that more optical modulators, polarization rotators, and polarization modulators are required depending on the number of signals to be multiplexed.

Third Embodiment

The orthogonal polarization multiplexing transmitter shown in FIG. 5 includes the polarization modulator described in the aforementioned non-patent document authored by E. Hu et al. and can be used as a polarization modulator. This suggests that a single orthogonal polarization multiplexing transmitter can be used to perform polarization modulation and electric-field modulation based on data simultaneously. In the field of wireless communications, this kind of technique is disclosed in JP-T-2007-506291.

In this embodiment, an optical polarization-multiplexed signal with an arbitrarily polarization is generated by modulating the amplitudes and/or phases of two optical signals with mutually orthogonal polarized waves adequately.

Figure 9:
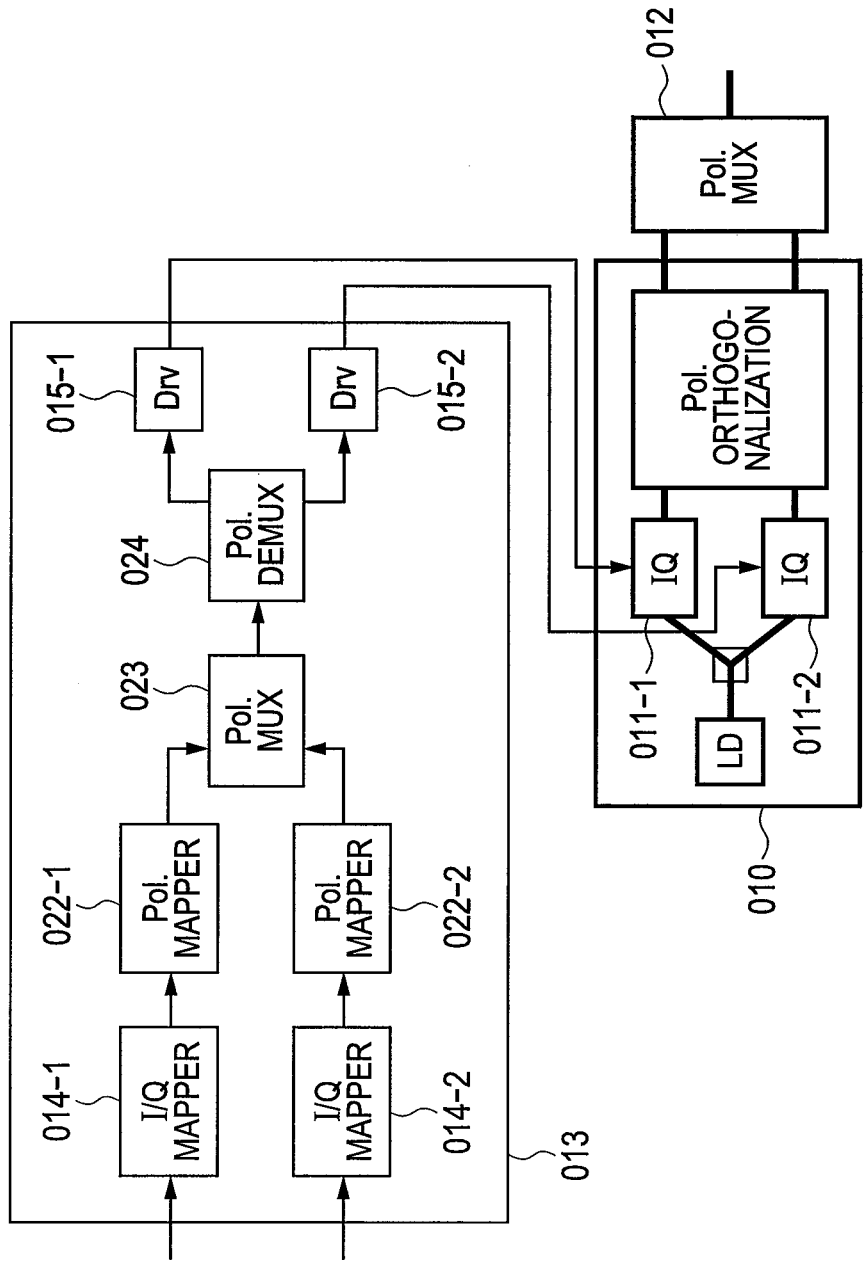
FIG. 9 shows an example of the configuration of a third embodiment of the invention.

FIG. 9 shows an example of the configuration of the third embodiment.

The optical polarization multiplexing transmitter includes: an orthogonally polarized signal generator 010 which has two optical modulators 011-1 and 011-2 for modulating the amplitudes and/or phases of two optical signals respectively and generates optical signals with two mutually orthogonal polarized waves (for example, TE and TM polarizations); a polarization multiplexer 012 which multiplexes the two optical signals modulated by the two optical modulators 011-1 and 011-2 and outputs a single polarization multiplexed signal; and a modulator driver 013 which drives the two optical modulators 011-1 and 011-2. This general configuration is the same as that of the orthogonal polarization multiplexing transmitter shown in FIG. 5, but the internal configuration of the modulator driver 013 is largely different.

In the modulator driver 013, two electric field mappers 014-1 and 014-2 with a function to convert data into electric fields uniquely convert two data strings into electric field signals respectively. Two polarization mappers 022-1 and 022-2 with a function to convert an incoming electric field into an arbitrary polarization having that electric field convert the two electric field signals into polarized electric field signals with different polarized waves as desired (for example, a TE polarization and a 45° polarized wave) respectively. A polarization multiplexer 023 multiplexes the two polarized electric field signals into a multiplexed polarized electric field signal. A polarization demultiplexer 024 demultiplexes the multiplexed polarized electric field signal into two polarized wave components consistent with the polarized waves (for example, TE and TM polarizations) of the two optical signals generated by the orthogonally polarized signal generator 010. Two drive signal generators 015-1 and 015-2 generate drive signals to drive the optical modulators 011-1 and 011-2 so that the electric field signals with the two polarized wave components from the polarization demultiplexer 024 are consistent with the electric fields of the optical signals coming from the two optical modulators 011-1 and 011-2. Since the optical transmitter uses the optical modulators 011-1 and 011-2 with non-linear input/output characteristics to modulate optical signals, the drive signal generators 015-1 and 015-2 are used to cancel such input/output characteristics.

In the example shown in FIG. 9, two data strings are converted into two polarized electric field signals, but the number of data strings to be converted into polarized electric field signals can be an arbitrary number N. However, if that is the case, it is necessary to use N electric field mappers which convert N data strings into electric field signals respectively, N polarization mappers which convert the N electric field signals into polarized electric field signals with arbitrary different polarized waves respectively, and a polarization multiplexer 023 which multiplexes the N polarized electric field signals into a multiplexed polarized electric field signal.

The modulator driver 013 includes polarization mappers 022-1 and 022-2 and polarization processors such as a polarization multiplexer 023 and a polarization demultiplexer 024 so as to process the polarized waves of multilevel-modulated electric field signals.

An electric field signal with a polarized wave can be represented by a Stokes vector or Jones vector. A Stokes vector is a three-dimensional vector composed of electric fields of the S1, S2, and S3 axes of the Poincare sphere shown in FIG. 2A, while a Jones vector is a two-dimensional vector composed of electric fields $E_x$ and $E_y$ of mutually orthogonal polarized waves, such as TE polarization 00A and TM polarization 00B, as expressed by Equation 1.

$$\begin{pmatrix} E_x \\ E_y \end{pmatrix} = \begin{pmatrix} I_x + jQ_x \\ I_y + jQ_y \end{pmatrix} \quad \text{[Equation 1]}$$

Here, $I_x$ and $Q_x$ denote the real part and imaginary part of electric field $E_x$ as expressed on a complex plane; the square root of $I_x^2 + Q_x^2$ denotes the electric field amplitude of $E_x$; and $\tan^{-1}(Q_x, I_x)$ denotes the electric field phase of $E_x$. Likewise, $I_y$ and $Q_y$ denote the real part and imaginary part of electric field $E_y$. Although processing of polarized waves is explained using Jones vectors in this specification, polarized waves may be processed using another expression method such as Stokes vectors.

The polarization mappers 022-1 and 022-2 may be considered to convert incoming electric field signals into Jones vectors. For example, the Jones vector of right-handed circular polarized wave 00E is expressed by Equation 2 and for the conversion of electric field $E_o$ into a right-handed circular polarized wave, a Jones vector expressed by Equation 3 is created by multiplication of both.

$$\frac{1}{\sqrt{2}} \begin{pmatrix} 1 \\ -j \end{pmatrix} \quad \text{[Equation 2]}$$

$$\frac{1}{\sqrt{2}} \begin{pmatrix} E_o \\ -jE_o \end{pmatrix} \quad \text{[Equation 3]}$$

The polarization multiplexer 023 can be considered to sum up a plurality of incoming Jones vectors. The polarization demultiplexer 024 can be considered to divide an incoming Jones vector into components and output them. However, in order to divide a Jones vector with TE polarization 00A and TM polarization 00B into polarized waves different from them (for example, +45° polarized wave 00C, and −45° polarized wave 00D), the vector must be converted into a Jones vector with desired polarized wave components before it is divided. Conversion of polarized waves can be represented by a Jones matrix of two rows and two columns. Conversion of polarized waves will be explained next when the fourth embodiment is described.

The above electric field mappers may output mapped electric fields in a linearly distorted form (such as wavelength dispersion). For this purpose, a preliminary wavelength dispersion technique may be combined.

Fourth Embodiment

In the third embodiment, optical polarization-multiplexed signals whose polarized waves are modulated arbitrarily can be generated by modulating the polarized waves of polarized electric field signals before they are multiplexed by the polarization multiplexer 023.

Figure 10:
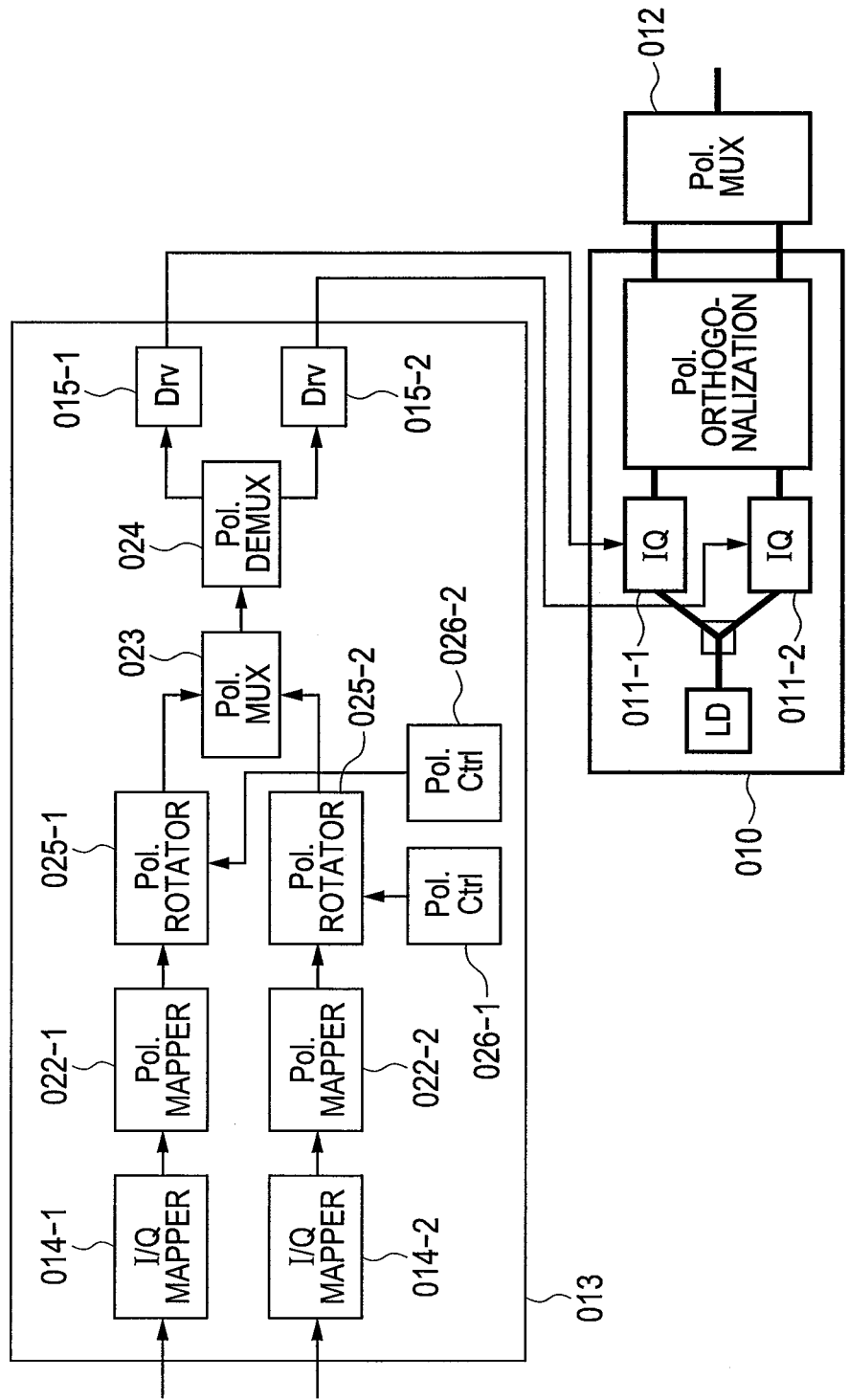
FIG. 10 shows an example of the configuration of a fourth embodiment of the invention.

FIG. 10 shows an example of the configuration of the fourth embodiment.

Here, newly added to the configuration of the third embodiment shown in FIG. 9 are: polarization rotators 025-1 and 025-2 which rotate the polarized waves of two polarized electric field signals coming from the polarization mappers 022-1 and 022-2 respectively; and polarization rotation controllers 026-1 and 026-2 which drive the polarization rotators 025-1 and 025-2 respectively. The polarization multiplexer 023 multiplexes the two polarized electric field signals rotated by the polarization rotators 025-1 and 025-2 and outputs a single multiplexed polarized electric field signal.

In this embodiment as well, the number of data strings to be converted into polarized electric field signals can be an arbitrary number N. However, if that is the case, it is necessary to use N electric field mappers which convert N data strings into electric field signals respectively, N polarization mappers which convert the N electric field signals into polarized electric field signals, N polarization rotators which rotate the polarized waves of the N polarized electric field signals, N polarization rotation controllers which drive the N polarization rotators, and a polarization multiplexer 023 which multiplexes the N polarized electric field signals into a multiplexed polarized electric field signal.

In this embodiment, the polarization rotators 025-1 and 025-2 modulate the polarized waves of polarized electric field signals coming from the polarization mappers 022-1 and 022-2 respectively. Therefore, the polarized waves of polarized electric field signals from the polarization mappers 022-1 and 022-2 may coincide with each other. However, in that case, it is necessary to give an offset to polarization rotation by either the polarization rotator 025-1 or 025-2 so that the relation between the polarized waves of the polarized electric field signals is adequate.

Rotation of polarization expressed by a Jones vector can be represented by the product of the Jones vector and a Jones matrix of two rows and two columns as expressed by Equation 4.

$$\begin{pmatrix} R_{00} & R_{01} \\ R_{10} & R_{11} \end{pmatrix} \quad \text{[Equation 4]}$$

Figure 4A:
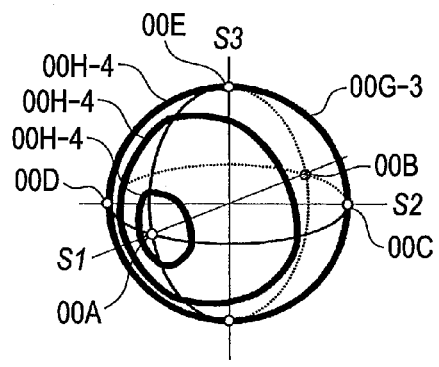
Figure 4B:
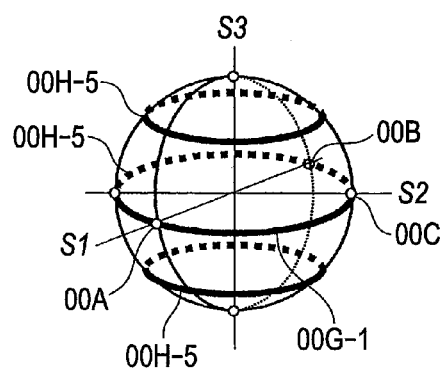
Figure 4C:
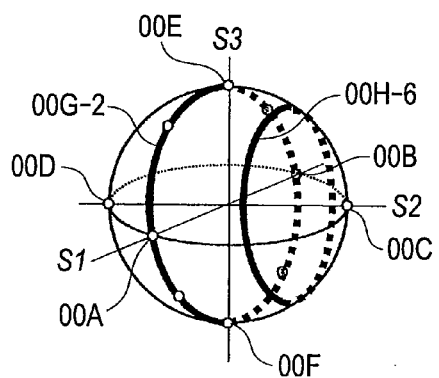

Here, each component of the Jones matrix is expressed by a function of two parameters $\theta$ and $\phi$, which are identical to the angles $\theta$ and $\phi$ representing an arbitrary polarization 009 on the Poincare sphere shown in FIG. 4A. A simple example of a Jones matrix to rotate an incoming polarized wave by angle $\theta$ is expressed below by Equation 5.

$$\begin{pmatrix} \cos\theta & -\sin\theta \\ \sin\theta & \cos\theta \end{pmatrix} \quad \text{[Equation 5]}$$

When the polarized wave represented by the Jones vector of Equation 3 is rotated by angle $\theta$, the rotated polarized wave is represented by a Jones vector of Equation 6 as shown below.

$$\frac{1}{\sqrt{2}} \begin{pmatrix} E_o\cos\theta + jE_o\sin\theta \\ E_o\sin\theta - jE_o\cos\theta \end{pmatrix} = \begin{pmatrix} \cos\theta & -\sin\theta \\ \sin\theta & \cos\theta \end{pmatrix} \times \frac{1}{\sqrt{2}} \begin{pmatrix} E_o \\ -jE_o \end{pmatrix} \quad \text{[Equation 6]}$$

The same is true for angle $\phi$. Thus, the polarization rotators 025-1 and 025-2 can be interpreted to multiply an incoming Jones vector by a Jones matrix.

Fifth Embodiment

This embodiment is a variation of the fourth embodiment which generates optical polarization-multiplexed signals which are polarization-scrambled arbitrarily.

Figure 11:
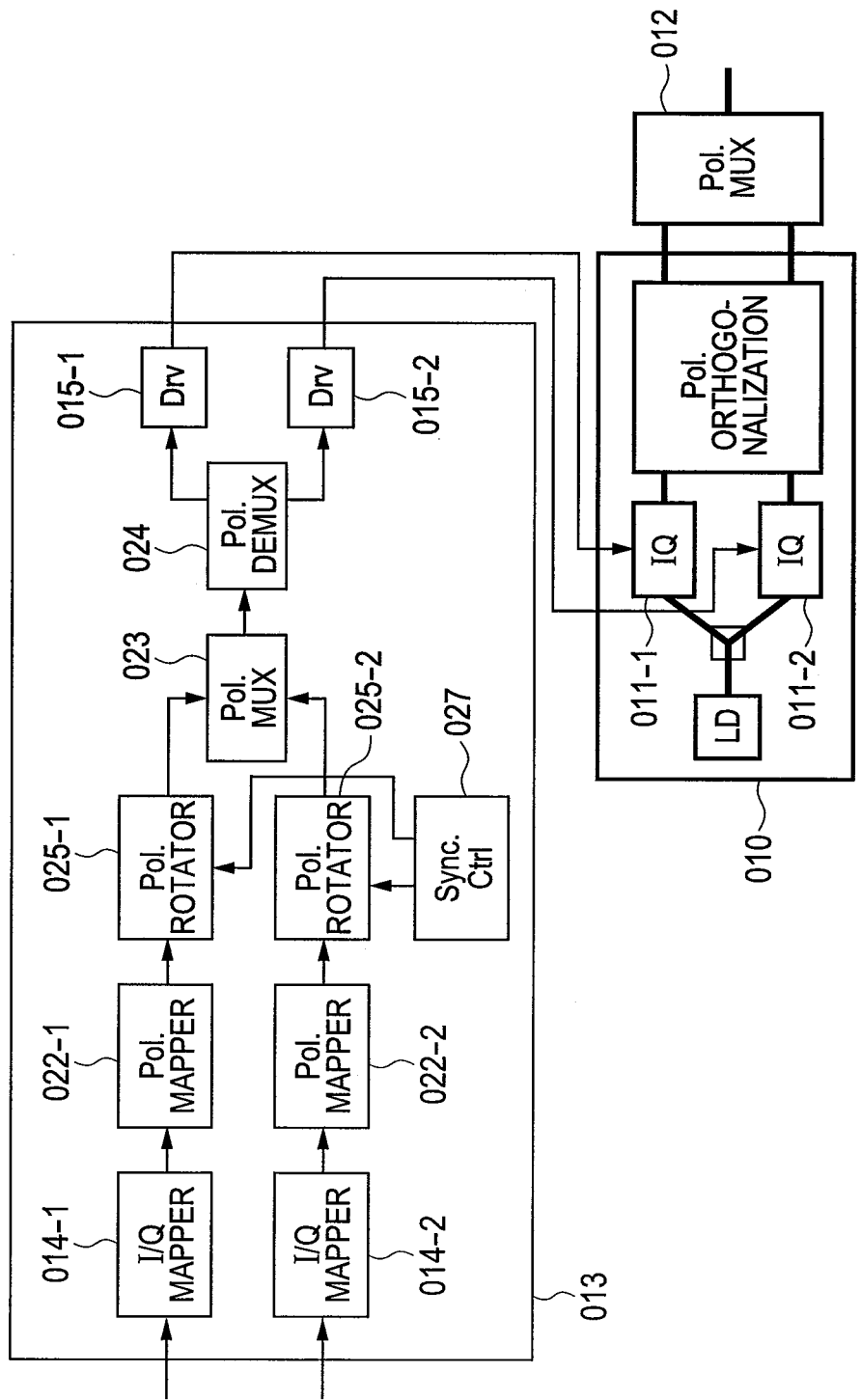
FIG. 11 shows an example of the configuration of a fifth embodiment of the invention.

FIG. 11 shows an example of the configuration of the fifth embodiment.

As compared with the configuration of the fourth embodiment shown in FIG. 10, this embodiment newly adds one polarization synchronization controller 027 for driving the polarization rotators 025-1 and 025-2, in place of the two polarization rotation controllers 026-1 and 026-2. The polarization synchronization controller 027 synchronizes the polarization rotators 025-1 and 025-2 and drives them so that they uniformly rotate the polarized waves of signals entering them. Consequently, the polarized waves of two polarized electric field signals are rotated while the relation between these waves is maintained, so that the polarization multiplexer 012 emits polarization multiplexed signal with polarized waves rotated in the same way. It is also possible to rotate polarized waves cyclically or in a specific pattern. It is also possible to rotate the polarized waves of the two polarized electric field signals without maintaining the relation between the polarized waves, or rotate the polarized waves independently from each other.

Any means may be adopted to synchronize the two polarization rotators 025-1 and 025-2. One method for such synchronization is that the polarization synchronization controller 027 sends an equal drive signal to the two polarization rotators 025-1 and 025-2 and uses the transmission paths of the same length for the signal. Another method is that the relation between the polarized waves of the two polarized electric field signals rotated by the two polarization rotators 025-1 and 025-2 is detected at the input end of the polarization multiplexer 023.

In this embodiment as well, the number of data strings to be converted into polarized electric field signals can be an arbitrary number N. However, if that is the case, it is necessary to use N electric field mappers which convert N data strings into electric field signals respectively, N polarization mappers which convert the N electric field signals into polarized electric field signals, N polarization rotators which modulate the N polarized electric field signals, a polarization synchronization controller 027 which drives the N polarization rotators, and a polarization multiplexer 023 which multiplexes the N polarized electric field signals into a multiplexed polarized electric field signal.

In this embodiment as well, the polarization rotators 025-1 and 025-2 modulate the polarized waves of polarized electric field signals coming from the polarization mappers 022-1 and 022-2 respectively. Therefore, the polarized waves of polarized electric field signals from the polarization mappers 022-1 and 022-2 may coincide with each other. However, in that case, it is necessary to give an offset to polarization rotation by either the polarization rotator 025-1 or 025-2 so that the relation between the polarized waves of the polarized electric field signals is adequate.

This embodiment can be applied to telecommunications and wireless communications in which electricity and radio waves are used for transmission signals. In that case, the laser light source (LD) should be a device which generates electric signals or radio signals.

Sixth Embodiment

In the fifth embodiment, plural polarization rotators must be synchronized. In large-capacity optical transmissions, the signal speed may exceed 20 gigabits/second and if the synchronization error tolerance is, for example, 1/10, synchronization must be controlled with an accuracy of 5 picoseconds (equivalent to 1 millimeter light path) or less. In addition, the number of polarization rotators must be increased depending on the number (N) of data strings or polarized waves to be transmitted.

Therefore, in this embodiment, one polarization rotator is used instead of the above plural polarization rotators and the polarization synchronization controller 027 is eliminated.

Figure 12:
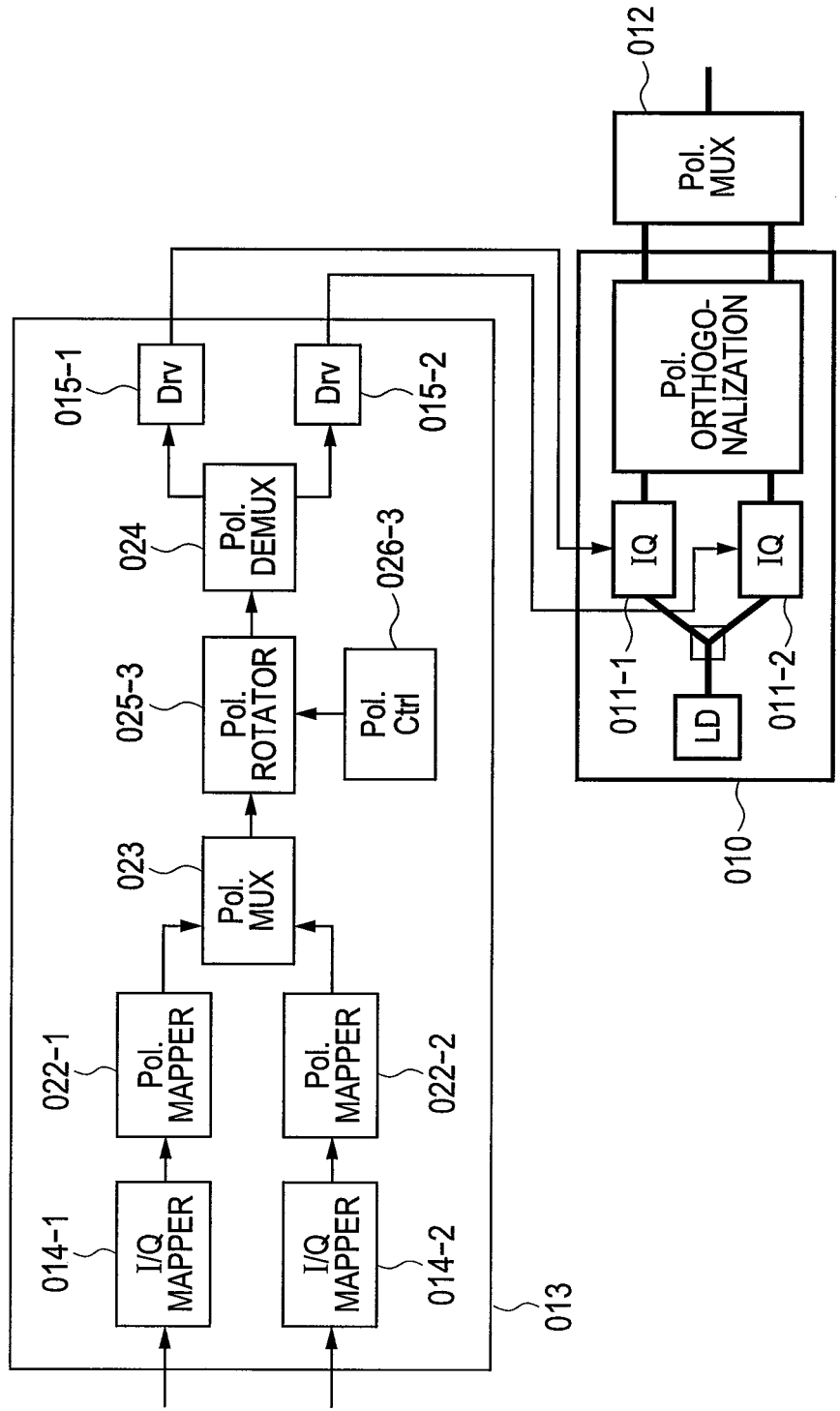
FIG. 12 shows an example of the configuration of a sixth embodiment of the invention.

FIG. 12 shows an example of the configuration of the sixth embodiment.

As compared with the configuration of the fifth embodiment shown in FIG. 11, this embodiment eliminates the polarization rotators 025-1 and 025-2 and the polarization synchronization controller 027 which drives them. The polarized electric field signals coming from the two polarization mappers 022-1 and 022-2 are multiplexed into a single polarized electric field signal by the polarization multiplexer 023. Also, this embodiment newly adds a polarization rotator 025-3 which rotates the polarized waves of the multiplexed polarized electric field signal and outputs it to the polarization demultiplexer 024 and a polarization rotation controller 026-3 which drives the polarization rotator 025-3. Consequently, the polarized waves of two polarized electric field signals from the polarization mappers 022-1 and 022-2 are uniformly rotated while the relation between the polarized waves is maintained, so that the polarization multiplexer 012 emits polarization multiplexed signal with polarized waves rotated in the same way. The polarization rotation controller 026-3 controls the pattern and periodicity of polarization rotation.

In this embodiment as well, the number of data strings to be converted into polarized electric field signals can be an arbitrary number N. However, if that is the case, it is necessary to use N electric field mappers which convert N data strings into electric field signals respectively, N polarization mappers which convert the N electric field signals into polarized electric field signals, and a polarization multiplexer 023 which multiplexes the N polarized electric field signals into a multiplexed polarized electric field signal.

This embodiment can also be applied to telecommunications and wireless communications in which electricity and radio waves are used for transmission signals.

Seventh Embodiment

As described in the aforementioned non-patent document authored by E. Hu et al, by dividing one polarized wave into two mutually orthogonal polarized wave components and modulating the amplitude ratio and phase difference between them, the polarization can be modulated. The seventh embodiment uses a simplified form of the modulator driver 013 based on this kind of polarization modulation.

Figure 13:
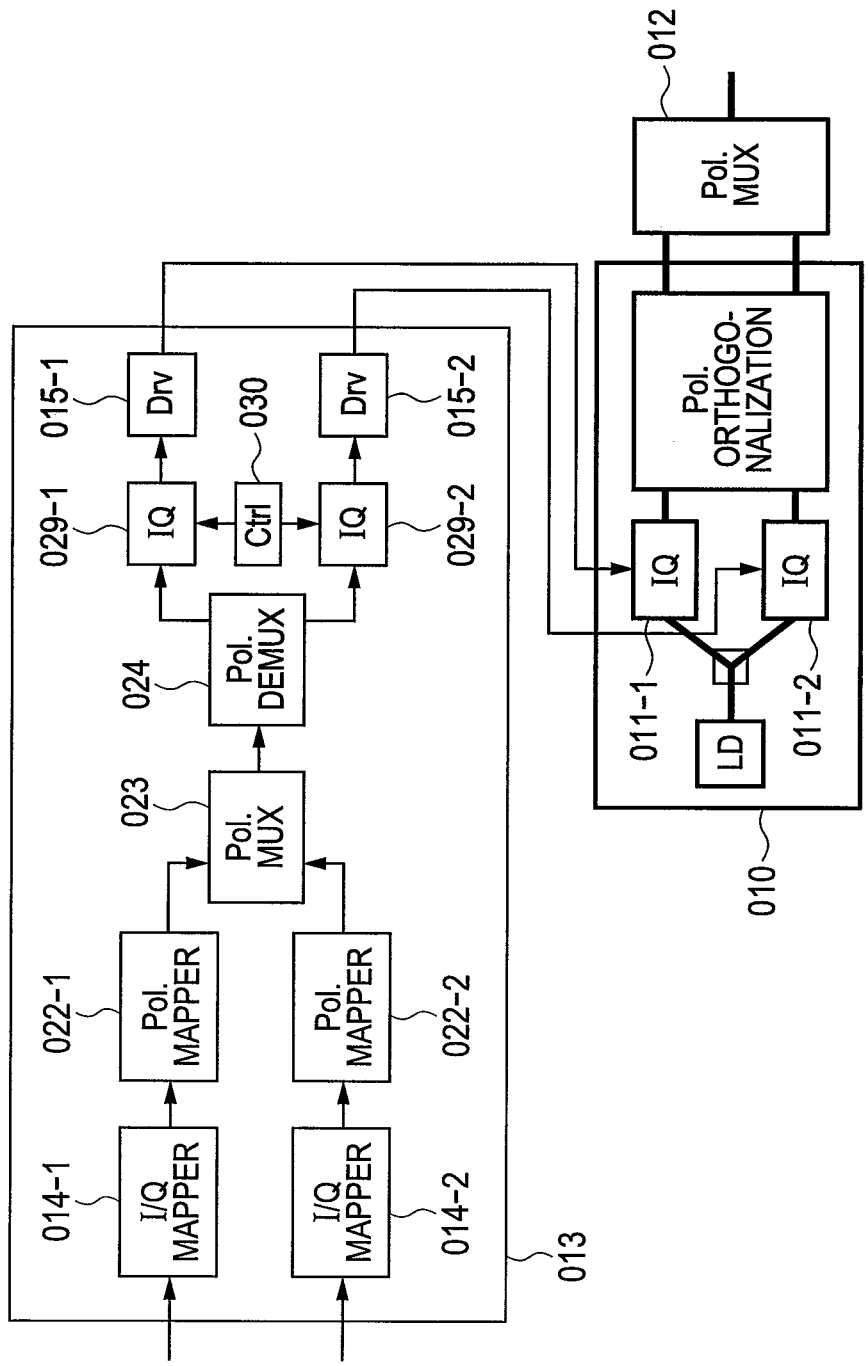
FIG. 13 shows an example of the configuration of a seventh embodiment of the invention.

FIG. 13 shows an example of the configuration of the seventh embodiment.

The polarization multiplexing transmitter includes: an orthogonal polarization multiplexing transmitter including an orthogonally polarized signal generator 010 which has two optical modulators 011-1 and 011-2 for modulating the amplitudes and/or phases of two optical signals and generates optical signals with two mutually orthogonal polarized waves (for example, TE polarization 00A and TM polarization 00B) and a polarization multiplexer 012 which multiplexes the two optical signals modulated by the two optical modulators 011-1 and 011-2 and outputs a single polarization multiplexed signal; and a modulator driver 013 which drives the optical modulators 011-1 and 011-2.

In the modulator driver 013, two electric field mappers 014-1 and 014-2 with a function to convert data into electric fields uniquely convert two data strings into electric field signals and output the signals to the polarization mappers 022-1 and 022-2 respectively. The polarization mappers 022-1 and 022-2 have a function to convert an incoming electric field into an arbitrary polarization having that electric field and convert the two electric field signals into polarized electric field signals with specific polarized waves. The specific polarized waves are arbitrary polarizations (+45° polarized wave 00C, and −45° polarized wave 00D in the example) on an equator (for example, circumference 00G-3 in FIG. 4A) with the line (S1 axis in the example) connecting two polarized waves generated by the orthogonally polarized signal generator 010 as the axis of rotation on the Poincare sphere. A polarization multiplexer 023 multiplexes the two polarized electric field signals into a multiplexed polarized electric field signal. After a polarization demultiplexer 024 demultiplexes the multiplexed polarized electric field signal into two polarized wave components (TE polarization 00A and TM polarization 00B in the example) generated by the orthogonally polarized signal generator 010, the electric field modulation processors 029-1 and 029-2 modulate the amplitudes and/or phases of the polarized wave components. The electric field modulation processors 029-1 and 029-2 are synchronized and driven by a field modulation controller 030. Then, two drive signal generators 015-1 and 015-2 drive the optical modulators 011-1 and 012 respectively so that the two electric field signals emitted from the electric field modulation processors 029-1 and 029-2 are consistent with the electric fields of optical signals emitted from the optical modulators 011-1 and 011-2.

Thus, polarization multiplexed signal which is obtained by multiplexing optical signals with polarized waves (+45° polarized wave 00C, and −45° polarized wave 00D in the example) generated by the polarization mappers 022-1 and 022-2 is polarization-scrambled and the polarization-scrambled polarization-multiplexed light is emitted from the polarization multiplexer 012. In this embodiment, optical signals which do not have two polarized waves (TE polarization 00A and TM polarization 00B in the example) generated by the orthogonally polarized signal generator 010 are multiplexed and the multiplexed signal light is emitted.

This embodiment can be considered to combine a first polarization modulator and a second polarization modulator in which the former divides, for example, a +45° polarized wave into TE and TM polarization components and modulates the phase ratio and/or phase difference between them and the latter divides a −45° polarized wave into TE and TM polarization components and modulates the phase ratio and/or phase difference between them.

In this embodiment as well, the number of data strings to be converted into polarized electric field signals can be an arbitrary number N. However, if that is the case, it is necessary to use N electric field mappers which convert N data strings into electric field signals respectively, N polarization mappers which convert the N electric field signals into polarized electric field signals, and a polarization multiplexer 023 which multiplexes the N polarized electric field signals into a multiplexed polarized electric field signal.

The steps from the electric field mappers 014-1 and 014-2 to the polarization multiplexer 023 may also be implemented in another form. For example, if the electric field mappers 014-1 and 014-2 convert data strings into electric field signals using QPSK shown in FIG. 6A, the polarization multiplexer 023 outputs an electric field symbol among the nine electric field symbols of the QAM (Quadrature Amplitude Modulation) shown in FIG. 6B. This is because the two components of a Jones vector from the polarization multiplexer 023 turn into an electric field signal multiplexed with an electric field signal obtained by multiplexing the two electric field signals generated by the electric field mappers 014-1 and 014-2 with a phase difference of 180 degrees between them. Therefore, the steps from the electric field mappers 014-1 and 014-2 to the polarization multiplexer 023 may be implemented by logical operations of data strings based on the abovementioned fact.

When the electric field modulation processors 029-1 and 029-2 modulate the amplitude ratio between two mutually orthogonal polarized wave components (for example, TE and TM polarizations), the relation between the two polarized wave components is lost as in the case of signal degradation due to PDL as described in reference to FIGS. 1A to 1D. For this reason, it is acceptable that the electric field modulation processors 029-1 and 029-2 modulate only the phase difference between the two polarized wave components. Simply by doing so, polarization rotation can be performed on the multiplexed polarized electric field signal emitted from the polarization multiplexer 023 with the line (S1 axis in the example) connecting the two polarized wave components as the axis of rotation on the Poincare sphere. If one data string is assigned to one polarized wave for transmission or the relation between the two polarized wave components need not be maintained, the electric field modulation processors 029-1 and 029-2 may be used to modulate the amplitude ratio between the two polarized waves.

This embodiment can be applied to telecommunications and wireless communications in which electricity and radio waves are used for transmission signals.

Eighth Embodiment

Even an orthogonally polarized multiplexed signal which combines two mutually orthogonal polarized waves electric-field-modulated independently from each other is observed on the Poincare sphere as a single state of light with two different polarized waves. This polarization varies depending on the amplitude ratio and phase difference between the two polarized waves.

In the eighth embodiment, the polarization of an orthogonally polarized multiplexed signal is modulated by modulating the phase difference between two mutually orthogonal polarized waves electric-field-modulated independently.

Figure 18:
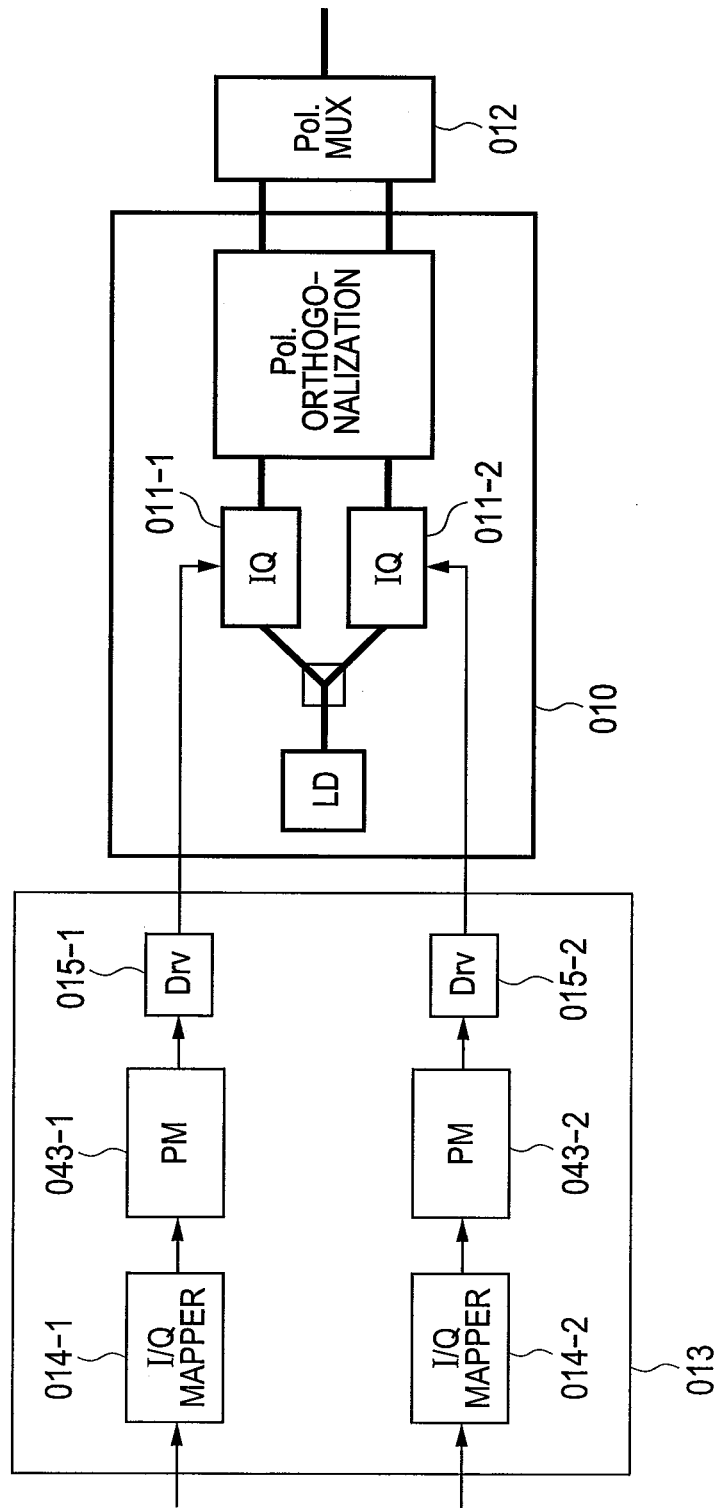
FIG. 18 shows an example of the configuration of an eighth embodiment of the invention.

FIG. 18 shows an example of the configuration of the eighth embodiment. The configuration in this example is explained below.

The configuration includes: an orthogonal polarization multiplexing transmitter having an orthogonally polarized signal generator 010 which generates optical signals with two mutually orthogonal polarized waves, two optical modulators 011-1 and 011-2 which modulate the amplitudes and/or phases of the two optical signals, and a polarization multiplexer 012 which multiplexes the two optical signals modulated by the two optical modulators 011-1 and 011-2 and outputs a single polarization multiplexed signal; and a modulator driver 013 which drives the two optical modulators 011-1 and 011-2.

The modulator driver 013 converts two data strings into electric field signals using two electric field mappers 014-1 and 014-2 with a function to convert data into electric fields uniquely and includes electric field phase modulators 043-1 and 043-2 to modulate the phase(s) of either or both of the two electric field signals in order to modulate the phase difference between the two electric field signals, and drives the optical modulators 011-1 and 011-2 respectively so that the two electric field signals modulated by the electric field phase modulators 043-1 and 043-2 are consistent with the electric fields of optical signals emitted from the optical modulators 011-1 and 011-2.

The electric field phase modulators 043-1 and 043-2 can modulate the phase difference between two electric field signals emitted from the mappers 014-1 and 014-2 in a desired pattern such as a sinusoidal wave pattern.

Figure 19:
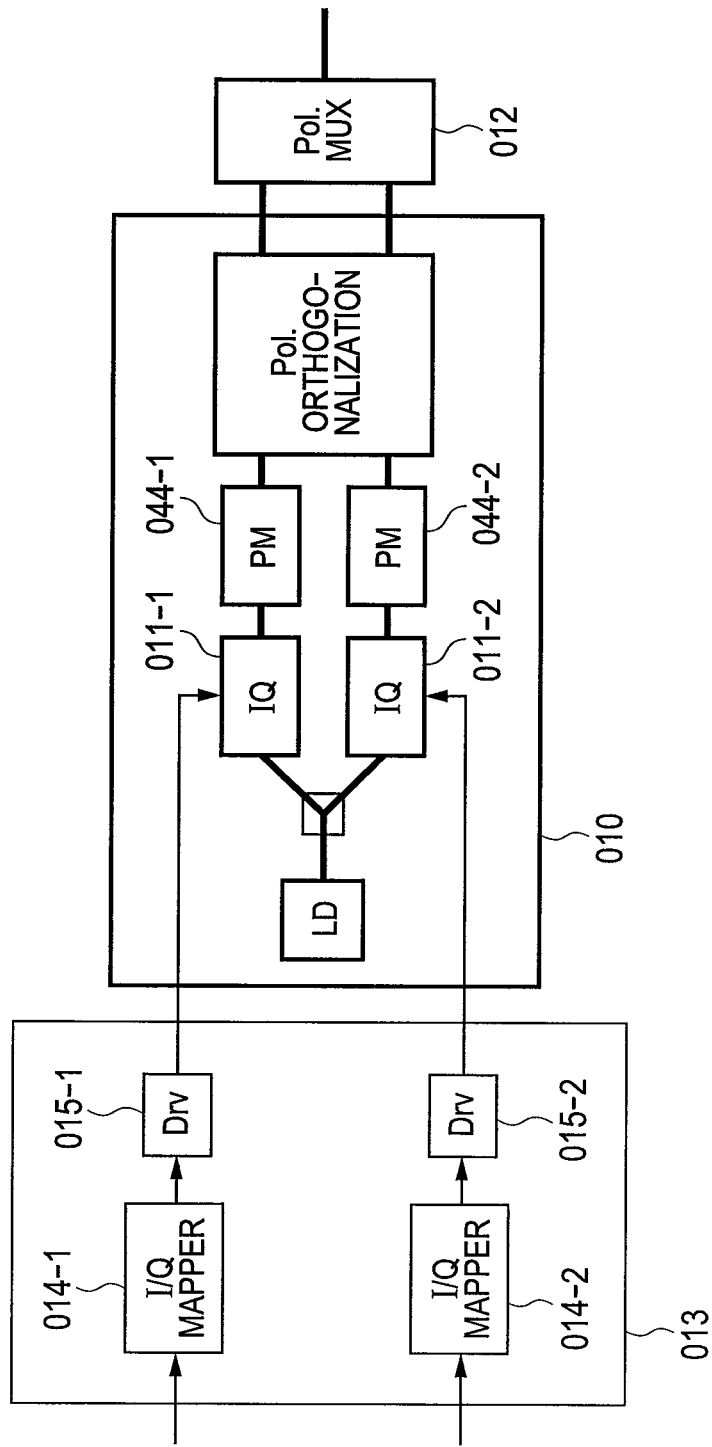
FIG. 19 shows another example of the configuration of the eighth embodiment of the invention.

FIG. 19 is another example of the configuration of the eighth embodiment. Inter-polarization phase difference modulators 044-1 and 044-2 which modulate the phase(s) of either or both of the two optical signals multiplexed by the polarization multiplexer 012 may be used in place of the two electric field phase modulators.

Ninth Embodiment

In the fourth, fifth, sixth, and seventh embodiments, a polarization rotation process which uses the polarization rotators 025-1, 025-2, and 025-3 or the electric field modulation processors 029-1 and 029-2 increases the number of modulation levels for electric field signals entering the drive signal generators 015-1 and 015-2 and deteriorates the signal waveform.

In the ninth embodiment, a limit is put on the above polarization rotation process so that the number of modulation levels for electric field signals entering the drive signal generators 015-1 and 015-2 does not increase excessively. The limit on the polarization rotation process should be such that the polarization rotation process is performed so as to limit change in the electric field signals entering the drive signal generators 015-1 and 015-2 as caused by the polarization rotation process to a specific state.

For example, this is achieved by decreasing the least common $T_3$ of modulation cycle $T_1$ of polarization modulation by the polarization rotators 025-1, 025-2, and 025-3 or electric field modulation by the electric field modulation processors 029-1 and 029-2 and modulation cycle $T_2$ of electric field signals emitted from the electric field mappers 014-1 and 014-2. For example, $T_1$ is so determined to make $T_3$ smaller than a predetermined threshold. Consequently, the number of modulation levels for electric field signals entering the drive signal generators 015-1 and 015-2 is reduced to $T_3/T_2$ of that in the case the polarization rotators 025-1, 025-2, and 025-3 or the electric field modulation processors 029-1 and 029-2 are not driven.

Tenth Embodiment

The following approach can be used in order to prevent the number of modulation levels for electric field signals entering the drive signal generators 015-1 and 015-2 in the seventh embodiment.

In the tenth embodiment, the electric field modulation controller 030 drives the electric field modulation processors 029-1 and 029-2 so that the electric field symbols (symbol group or pattern) of electric field signals entering the drive signal generators 015-1 and 015-2 become electric field symbols of any of electric field signals entering the electric field modulation processors 029-1 and 029-2.

Figure 6B:
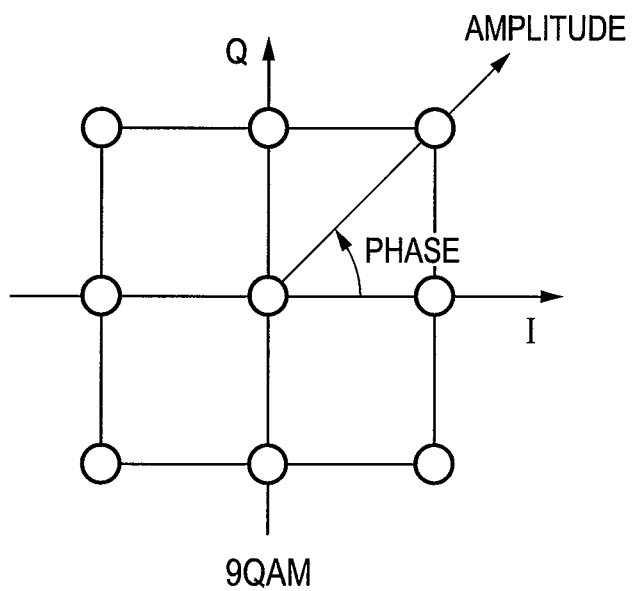

For example, the 9QAM signal shown in FIG. 6B remains so even if it is rotated 90 degrees. Therefore, if an electric field signal emitted from the polarization multiplexer 023 is a 9QAM signal, the electric field modulation processors 029-1 and 029-2 should modulate the phase of the incoming signal at intervals of 90 degrees. In this case, the steps from the electric field mappers 014-1 and 014-2 to the electric field modulation processors 029-1 and 029-2 can be replaced by logical operations of two data strings entering the electric field mappers 014-1 and 014-2.

Eleventh Embodiment

In order to prevent an increase in the number of modulation levels for electric field signals entering the drive signal generators 015-1 and 015-2 in the seventh embodiment, the eleventh embodiment newly adds an optical modulator to the orthogonally polarized signal generator 010 in place of the electric field modulation processors 029-1 and 029-2.

Figure 14:
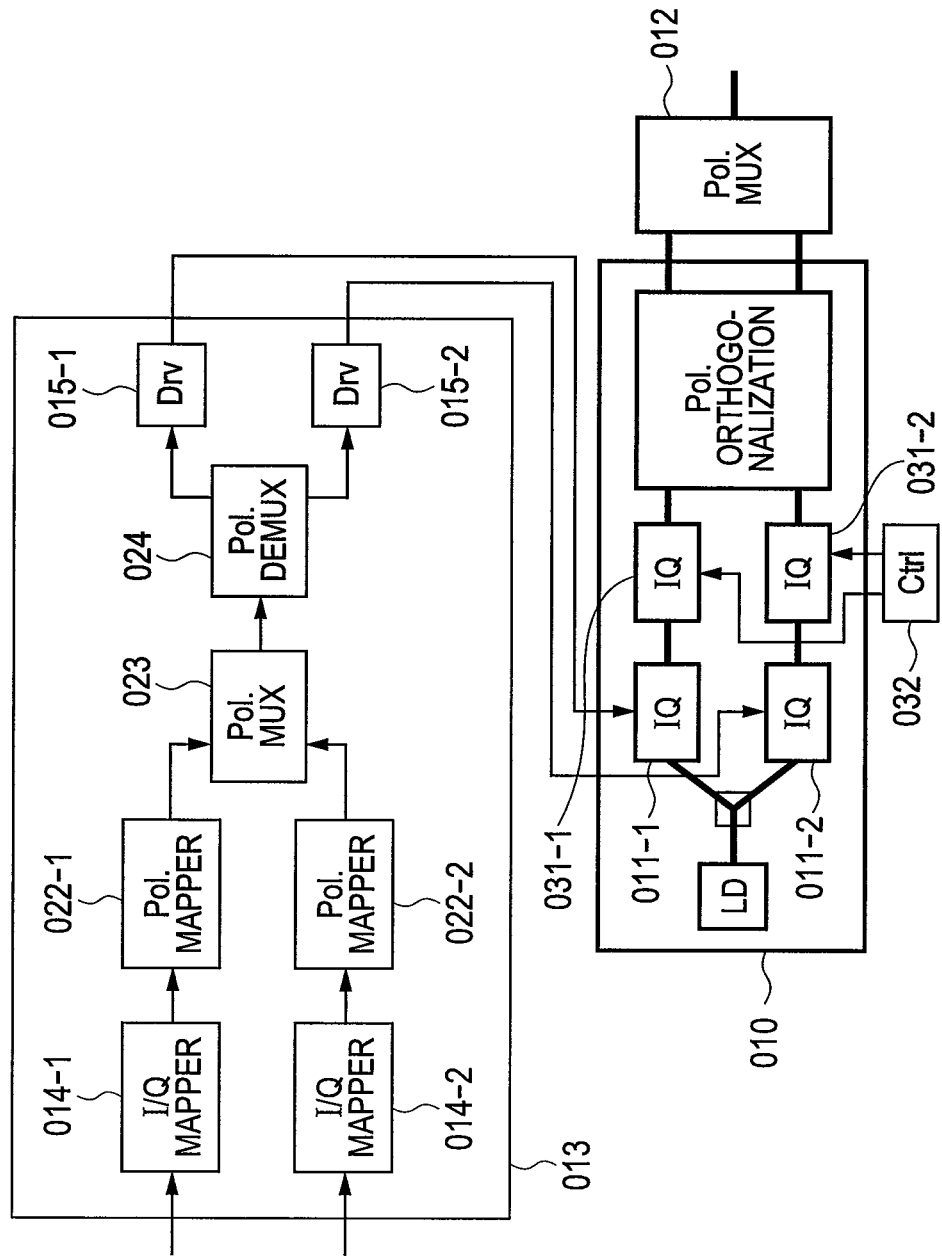
FIG. 14 shows an example of the configuration of an eleventh embodiment of the invention.

FIG. 14 shows an example of the configuration of the eleventh embodiment.

As compared with the seventh embodiment shown in FIG. 13, the eleventh embodiments removes the electric field modulation processors 029-1 and 029-2 and the electric field modulation controller 030 for driving them from the modulator driver 013 and inserts polarized light modulators 031-1 and 031-2 at the output ends of the optical modulators 011-1 and 011-2 and adds a polarized light modulator driver 032. The polarized light modulators 031-1 and 031-2 are driven by a polarized light modulator driver 032 to modulate the amplitude ratio and phase difference between two optical signals emitted from the optical modulators 011-1 and 011-2.

In this embodiment, since the process of polarization rotation by the modulator driver 013 is eliminated, the number of modulation levels for electric field signals entering the drive signal generators 015-1 and 015-2 does not increase. Instead, the drive signals for the polarized light modulators 031-1 and 032-2 which perform the polarization rotation process generally become multileveled. However, the use of sinusoidal waves with less inter-symbol interference as drive signals for the polarized light modulators 031-1 and 031-2 reduces drive signal waveform deterioration considerably.

An alternative approach is that without adding the polarized light modulators 031-1 and 031-2, drive signals for driving the optical modulators 011-1 and 011-2 and sinusoidal waves are superimposed on each other and these signals are used as drive signals for the optical modulators 011-1 and 011-2.

Twelfth Embodiment

In order to prevent waveform deterioration of electric field signals entering the drive signal generators 015-1 and 015-2 in the eighth embodiment, it is desirable that the number of modulation levels should never increase.

Therefore, in the twelfth embodiment, two electric field signals entering the drive signal generators 015-1 and 015-2 are alternated cyclically. Consequently, the polarized waves of electric field signals are cyclically changed without an increase in the number of modulation levels for the two electric field signals entering the drive signal generators 015-1 and 015-2.

Figure 15:
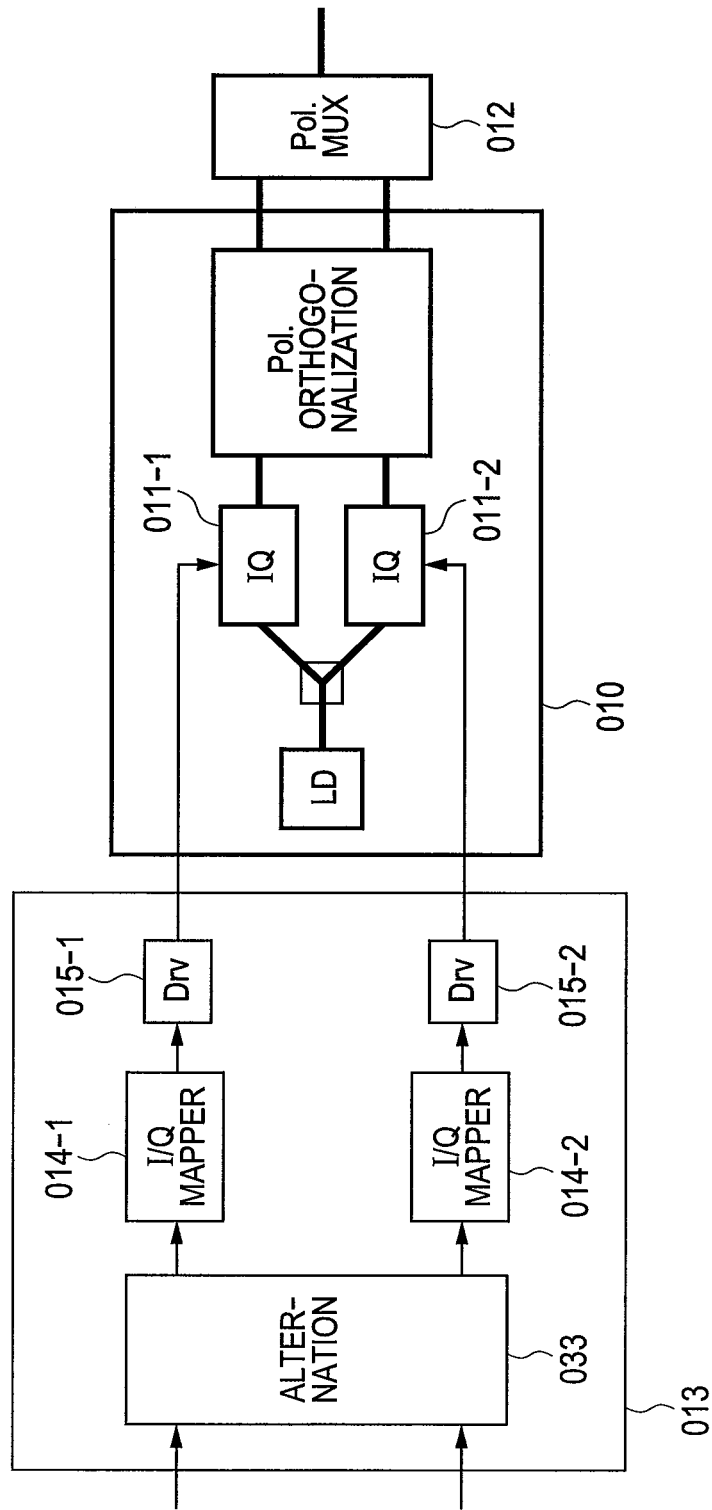
FIG. 15 shows an example of the configuration of a twelfth embodiment of the invention.

FIG. 15 shows an example of the configuration of the twelfth embodiment.

For example, the polarization multiplexing transmitter includes: an orthogonal polarization multiplexing transmitter having an orthogonally polarized signal generator 010 which has two optical modulators 011-1 and 011-2 for modulating the amplitudes and/or phases of two optical signals and generates optical signals with two mutually different polarized waves and a polarization multiplexer 012 which multiplexes the two optical signals coming from the two optical modulators 011-1 and 011-2 and outputs a single polarization multiplexed signal; and a modulator driver 013 which drives the two optical modulators 011-1 and 011-2. The modulator driver 013 includes: a data string alternation device 033 which alternates two incoming data strings cyclically and outputs two alternate data strings; electric field mappers 014; and drive signal generators 015. The two electric field mappers 014-1 and 014-2, with a function to convert data into electric fields uniquely, convert the two alternate data strings into electric field signals respectively. The drive signal generators 015-1 and 015-2 drive the optical modulators 011-1 and 011-2 so that the two electric field signals are consistent with the electric fields of the optical signals modulated by the optical modulators 011-1 and 011-2.

An optical receiver which receives optical signals from the optical transmitter according to this embodiment is expected to alternate the two received polarized signals again. This alternation process in the receiver should take place in synchronization with periodic data string alternation by the data string alternation device 033. Various known methods are available for this synchronization process. If the cycle and pattern of data string alternation by the data string alternation device 033 are predetermined, the processing timing of the optical receiver should be varied until a synchronization pattern such as a frame is obtained from data strings demodulated by the optical receiver. Especially, when the data string alternation device 033 alternates data strings in synchronization with the electric field mappers 014-1 and 014-2 in their symbol cycles, the optical receiver is merely expected to alternate the two polarized signals received by it in the symbol cycles.

In this embodiment, an electric field signal alternation device which alternates two incoming electric field signals cyclically and outputs two alternate electric field signals may be used in place of the data string alternation device 033. If that is the case, the two electric field mappers 014-1 and 014-2 convert the two data strings into electric field signals respectively and the electric field signal alternation device converts the two electric field signals into alternate electric field signals before the two alternate electric field signals enter the drive signal generators 015-1 and 015-2.

Thirteenth Embodiment

In an optical transmission system which uses a polarization multiplexing transmitter (or optical polarization multiplexing transmitter) according to any of the first to eleventh embodiments as an optical transmitter to transmit optical signals from the transmitter to an optical receiver, if the transmitter controls the polarization of output optical signals so as to cancel a polarization fluctuation in the transmission path from the transmitter to the receiver, the receiver need not use a polarization tracer. Even if output polarized waves are limited in the polarization multiplexing transmitter, it is possible to reduce the burdens on the polarization tracer of the receiver and alleviate the signal degradation caused by operation of the polarization tracer.

Figure 16:
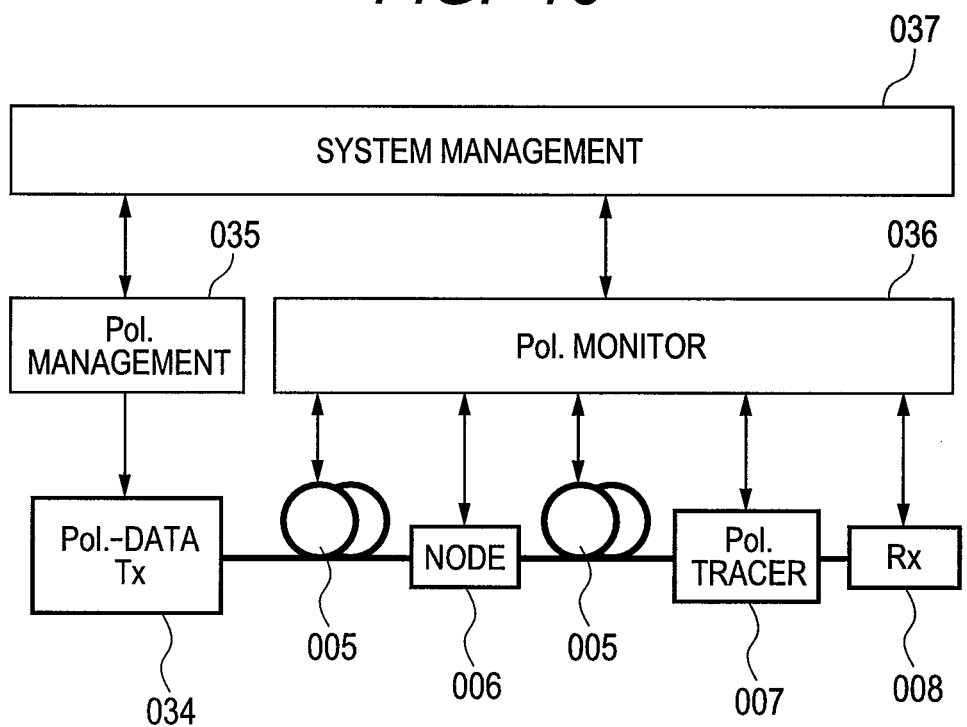
FIG. 16 shows an example of the configuration of a thirteenth embodiment of the invention.

FIG. 16 shows an example of the configuration of the thirteenth embodiment.

For example, the optical transmission system according to the thirteenth embodiment includes: a polarization multiplexing transmitter 034 according to any of the first to eleventh embodiments; an optical transmission path including an optical fiber transmission path 005 for transmitting optical signals from the transmitter 034 and/or an optical repeater (node) 006; an optical receiver 008 for receiving optical signals propagated in the optical transmission path; and a polarization tracer 007 for canceling a polarization fluctuation of an optical signal entering the optical receiver 008. In addition, the optical transmission system further includes: a transmission path polarization monitor 036 which detects polarization of an optical signal or the amount of dependence thereon; a polarization management device 035 which checks for a polarization fluctuation of the optical signal entering the optical receiver 008 based on the result of detection by the transmission path polarization monitor 036 and controls the polarized wave emitted from the transmitter 034 so as to eliminate such polarization fluctuation; and a system management device 037 which notifies the polarization management device 035 of the polarization fluctuation detected by the transmission path polarization monitor 036. If the optical receiver 008 is designed to cancel a polarization fluctuation of an optical signal which it has received, the polarization tracer 007 is omissible. If the transmission path is short, the optical repeater 006 is also omissible.

An ordinary polarization monitor or any other means such as a device which observes variations in reception sensitivity, waveform or frequency due to polarization fluctuations may be used for the transmission path polarization monitor 036.

One possible approach of polarization management is that, based on the fact that the error rate of optical signals entering the optical receiver 008 increases depending on their polarization fluctuations, information on this error rate is transmitted to the polarization management device 035 and the polarized waves emitted from the polarization multiplexing transmitter 034 are feedback-controlled so as to minimize the error rate.

Fourteenth Embodiment

In a wavelength multiplexing transmission system having polarization multiplexing transmitters (or optical polarization multiplexing transmitters) 034 according to any of the first to eleventh embodiments and a polarization-uncontrolled transmitter 038 incapable of controlling output polarized waves, comparison is made among the transmission wavelengths of all the polarization multiplexing transmitters 034 and the cycle and/or pattern of polarization scrambling between polarization multiplexing transmitters 034 with adjacent transmission wavelengths (wavelength patterns) is changed. Consequently, the probability of coincidence of output polarization between polarization multiplexing polarization multiplexing transmitters 034 with adjacent transmission wavelengths decreases, thereby suppressing mutual interaction between transmission signals from the transmitters 034 such as four-wave mixing or cross-phase modulation. Even if the transmission wavelength of the polarization-uncontrolled transmitter 038 is between adjacent transmission wavelengths of two polarization multiplexing transmitters 034, the probability of coincidence of output polarized waves between the two transmitters 034 decreases, thereby suppressing the influence of transmission signals from the two transmitters 034 on transmission signals from the polarization-uncontrolled transmitter 038. A known transmitter may be used for the polarization-uncontrolled transmitter 038. The polarization-uncontrolled transmitter 038 is omissible.

Figure 17:
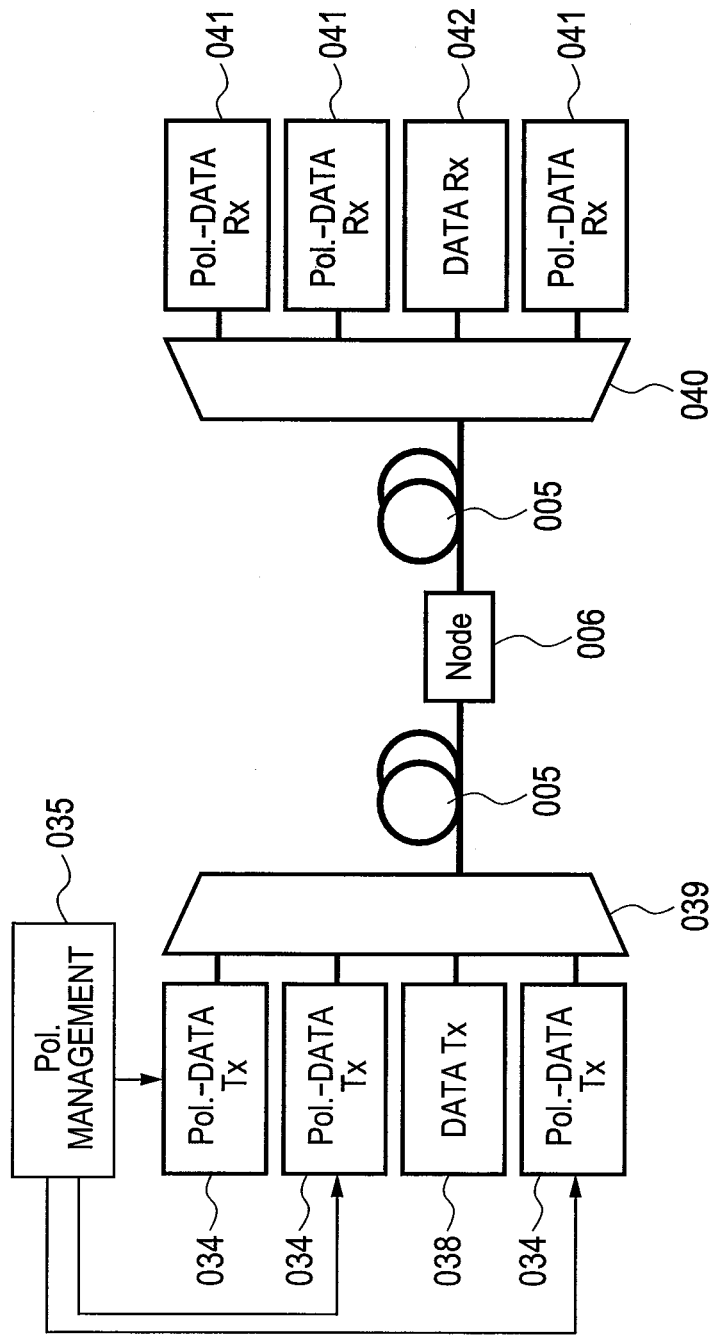
FIG. 17 shows an example of the configuration of a fourteenth embodiment of the invention.

FIG. 17 shows an example of the configuration of the fourteenth embodiment.

The optical transmission system according to this embodiment includes: one or plural polarization multiplexing transmitters 034 which control output polarized waves; one or plural polarization-uncontrolled transmitters which do not control output polarized waves; a wavelength multiplexer 039 which multiplexes transmission signals with different wavelengths from these transmitters and outputs a wavelength-multiplexed signal; an optical fiber transmission path 005 as an optical transmission path for guiding the wavelength-multiplexed signal to an optical receiver and an optical repeater (node) 006; a wavelength demultiplexer 040 which demultiplexes the wavelength-multiplexed signal coming from the optical transmission path into signals with different transmission wavelengths; one or plural polarization tracing receivers 041 which receive transmission signals from the polarization multiplexing transmitters 034 respectively; one or plural optical receivers 042 which receive transmission signals from the polarization-uncontrolled transmitters 038 respectively; and a polarization management device (polarization scrambling management device) 035 which manages output polarized waves from the plural polarization multiplexing transmitters 034.

The polarization management device 035 manages the transmission wavelengths and polarization of the plural polarization multiplexing transmitters 034 and controls them so as to prevent coincidence of the pattern and/or speed of polarization scrambling between polarization multiplexing transmitters 034 with adjacent transmission wavelengths.

Configuration Examples of the Preferred Embodiments

An optical polarization multiplexing transmitter includes an orthogonally polarized signal generator which multiplexes two optical signals with mutually orthogonal polarized waves and two polarization electric field modulators which modulate the amplitudes and/or phases of the two optical signals respectively and the transmitter multiplexes an arbitrary number of optical signals with arbitrary polarizations whose amplitudes and/or phases are modulated and outputs a polarization-multiplexed signal.

According to the first embodiment of the invention, for example, there is provided an optical polarization multiplexing transmitter which includes:

an orthogonal polarization multiplexing transmitter having an orthogonally polarized signal generator which generates two optical signals with mutually orthogonal polarized waves, two optical modulators which modulate the amplitudes and/or phases of the two optical signals, and a polarization multiplexer which multiplexes two optical signals emitted from the two optical modulators and outputs a single polarization multiplexed signal;

an optical modulator driver having two electric field mappers, with a function to convert data into electric fields uniquely, which convert two data strings into electric field signals respectively and two drive signal generators which drive the two optical modulators so that the two electric field signals are consistent with the electric fields of two optical signals emitted from the two optical modulators;

a polarization modulator which modulates the phase difference between two mutually orthogonal polarized wave components on a circumference of a circle having, in its plane, the center of the Poincare sphere and a line perpendicular to a line connecting two polarized waves from the orthogonal polarization multiplexing transmitter; and a driver which drives the polarization modulator.

According to the second embodiment of the invention, for example, there is provided an optical polarization multiplexing transmitter which includes:

an orthogonal polarization multiplexing transmitter having an orthogonally polarized signal generator which generates two optical signals with mutually orthogonal polarized waves respectively, two optical modulators which modulate the amplitudes and/or phases of the two optical signals respectively, two polarization modulators which modulate the polarized waves of the two optical signals, and a polarization multiplexer which multiplexes the two optical signals modulated by the two polarization modulators and outputs a single polarization multiplexed signal;

an optical modulator driver having two electric field mappers, with a function to convert data into electric fields uniquely, which convert two data strings into electric field signals respectively and two drive signal generators which drive the two optical modulators so that the two electric field signals are consistent with the electric fields of two optical signals emitted from the two optical modulators; and a polarization modulation driver which drives the two polarization modulators so that the angle between the polarized waves of output signals from the two polarization modulators is maintained constant and the waves are modulated uniformly.

According to the third embodiment, for example, there is provided an optical polarization multiplexing transmitter which includes:

an orthogonal polarization multiplexing transmitter having an orthogonally polarized signal generator which generates two optical signals with mutually orthogonal polarized waves, two optical modulators which modulate the amplitudes and/or phases of the two optical signals respectively, and a polarization multiplexer which multiplexes two optical signals modulated by the two optical modulators and outputs a single polarization multiplexed signal; and an optical modulator driver having plural electric field mappers, with a function to convert data into electric fields uniquely, which convert plural data strings into electric field signals respectively, plural polarization mappers, with a function to convert an incoming electric field into an arbitrary polarization having that electric field, which convert the plural electric field signals from the plural electric field mappers into polarized electric field signals with different polarized waves respectively, a polarization multiplexer which multiplexes the plural polarized electric field signals and generates a single multiplexed polarized electric field signal, a polarization demultiplexer which demultiplexes the multiplexed polarization electric field signal into electric field signals with two polarized wave components consistent with the two optical signals generated by the orthogonally polarized signal generator, and two drive signal generators which drive the two optical modulators so that the electric field signals with two polarized wave components from the polarization demultiplexer are consistent with the electric fields of the optical signals emitted from the two optical modulators.

According to the fourth embodiment of the invention, for example, there is provided an optical polarization multiplexing transmitter which includes:

an orthogonal polarization multiplexing transmitter having an orthogonally polarized signal generator which generates two optical signals with mutually orthogonal polarized waves, two optical modulators which modulate the amplitudes and/or phases of the two optical signals respectively, and a polarization multiplexer which multiplexes the two optical signals modulated by the two optical modulators and outputs a single polarization multiplexed signal; and an optical modulator driver having plural electric field mappers, with a function to convert data into electric fields uniquely, which convert plural data strings into electric field signals respectively, plural polarization mappers, with a function to convert an incoming electric field into an arbitrary polarization having that electric field, which convert the plural electric field signals from the plural electric field mappers into polarized electric field signals with different polarized waves respectively, plural polarization rotators which rotate the polarized waves of the plural polarized electric field signals respectively, a polarization rotation controller which controls the plural polarization rotators, a polarization multiplexer which multiplexes the polarized electric field signals emitted from the polarization rotators into a multiplexed polarized electric field signal, a polarization demultiplexer which demultiplexes the multiplexed polarized electric field signal into electric field signals with two polarized wave components consistent with the two optical signals generated by the orthogonally polarized signal generator, and two drive signal generators which drive the two optical modulators so that the electric field signals with two polarized wave components from the polarization demultiplexer are consistent with the electric fields of the optical signals emitted from the two optical modulators.

Also, there is provided a polarization multiplexing transmitter which multiplexes plural electric field signals with arbitrary polarizations and outputs a multiplexed signal, in which the amplitudes and/or phases of the plural electric fields are modulated respectively and all polarized waves are uniformly modulated.

According to the fifth embodiment of the invention, for example, there is provided a polarization multiplexing transmitter which includes:

an orthogonal polarization multiplexing transmitter having an orthogonally polarized signal generator which generates two transmission electric fields with mutually orthogonal polarized waves, two electric field modulators which modulate the amplitudes and/or phases of the two transmission electric fields respectively, and a polarization multiplexer which multiplexes two transmission electric fields modulated by the two electric field modulators and outputs a single polarization-multiplexed signal; and an electric field modulator driver having plural electric field mappers, with a function to convert data into electric fields uniquely, which convert plural data strings into electric field signals respectively, polarization mappers, with a function to convert an incoming electric field into an arbitrary polarization having that electric field, which convert the plural electric field signals into polarized electric field signals with different polarized waves, plural polarization rotators which rotate the polarized waves of the plural polarized electric field signals respectively, a polarization rotation controller which synchronizes the plural polarization rotators and drives the polarization rotators so as to rotate incoming polarized waves uniformly and cyclically, a polarization multiplexer which multiplexes the plural polarized electric field signals from the polarization rotators into a multiplexed polarized electric field signal, a polarization demultiplexer which demultiplexes the multiplexed polarized electric field signal into electric field signals with two polarized wave components consistent with the polarized waves of two transmission electric fields generated by the orthogonally polarized signal generator, and two drive signal generators which drive the two electric field modulators so that the electric field signals with two polarized wave components from the polarization demultiplexer are consistent with the output electric fields from the two electric field modulators.

According to the sixth embodiment of the invention, for example, there is provided a polarization multiplexing transmitter which includes:

an orthogonal polarization multiplexing transmitter having an orthogonally polarized signal generator which generates two transmission electric fields with mutually orthogonal polarized waves, two electric field modulators which modulate the amplitudes and/or phases of the two transmission electric fields respectively, and a polarization multiplexer which multiplexes two transmission electric fields modulated by the two electric field modulators and outputs a single polarization-multiplexed signal; and an electric field modulator driver having plural electric field mappers, with a function to convert data into electric fields uniquely, which convert plural data strings into electric field signals respectively, polarization mappers, with a function to convert an incoming electric field into an arbitrary polarization having that electric field, which convert the plural electric field signals into plural polarized electric field signals with different polarized waves, a polarization multiplexer which multiplexes the plural polarized electric field signals into a multiplexed polarized electric field signal, a polarization rotator which rotates the multiplexed polarized electric field signal, a polarization rotation controller which drives the polarization rotator so as to rotate an incoming polarized wave cyclically, a polarization demultiplexer which demultiplexes the multiplexed polarized electric field signal from the polarization rotator into electric field signals with two polarized wave components consistent with the polarized waves of two transmission electric fields generated by the orthogonally polarized signal generator, and two drive signal generators which drive the two electric field modulators so that the electric field signals with two polarized wave components from the polarization demultiplexer are consistent with the output electric fields from the two electric field modulators.

According to the seventh embodiment of the invention, for example, there is provided a polarization multiplexing transmitter which includes:

an orthogonal polarization multiplexing transmitter having an orthogonally polarized signal generator which generates two transmission electric fields with mutually orthogonal polarized waves, two electric field modulators which modulate the amplitudes and/or phases of the two transmission electric fields, and a polarization multiplexer which multiplexes two transmission electric fields modulated by the two electric field modulators and outputs a single polarization-multiplexed signal; and an electric field modulator driver having plural electric field mappers, with a function to convert data into electric fields uniquely, which convert plural data strings into electric field signals respectively, polarization mappers, with a function to convert an incoming electric field into an arbitrary polarization having that electric field, which convert the plural electric field signals into plural polarized electric field signals with different polarized waves as arbitrary polarizations on a circumference of a circle with an axis connecting the polarized waves of the two transmission electric fields as the axis of rotation on the Poincare sphere, a polarization multiplexer which multiplexes the polarized electric field signals into a multiplexed polarized electric field signal, a polarization demultiplexer which demultiplexes the multiplexed polarized electric field signal into electric field signals with two polarized wave components consistent with the polarized waves of the two transmission electric fields, two electric field modulation processors which modulate the amplitude ratio and/or phase difference between two polarized wave components from the polarization demultiplexer, an electric field modulation controller which drives the electric field modulation processors, and two drive signal generators which drive the two electric field modulators so that the output electric fields from the two electric field modulation processors are consistent with the two transmission electric fields modulated by the electric field modulators respectively.

According to the ninth embodiment of the invention, for example, there is provided a polarization multiplexing transmitter according to any of the fourth to seventh embodiments in which the modulation cycle of the polarization rotators as described in Claim 5, 7, or 8 or the electric field modulation processors as described in Claim 7 is determined so that the least common of the modulation cycle of the polarization rotators as described in Claim 5, 7, or 8 or the electric field modulation processors as described in Claim 7 and the modulation cycle of electric field signals emitted from the above electric field mappers is small.

According to the tenth embodiment of the invention, for example, there is provided a polarization multiplexing transmitter according to the seventh embodiment in which the two electric field modulators perform modulation so that the electric field symbol group of incoming electric field signals coincide with the electric field symbol group of outgoing electric field signals.

According to the eleventh embodiment of the invention, for example, there is provided a polarization multiplexing transmitter which includes:

an orthogonal polarization multiplexing transmitter having an orthogonally polarized signal generator which generates two transmission electric fields with mutually orthogonal polarized waves, two electric field modulators which modulate the amplitudes and/or phases of the two transmission electric fields, two polarization electric field modulators which further modulate the amplitudes and/or phases of the two transmission electric fields modulated by the two electric field modulators, a polarization electric field modulator driver which drives the two polarization electric field modulators so as to modulate the amplitude ratio and/or phase difference between transmission electric fields modulated by the two electric field modulators cyclically, and a polarization multiplexer which multiplexes two transmission electric fields from the two polarization electric field modulators and outputs a single polarization-multiplexed signal; and an electric field modulator driver having plural electric field mappers, with a function to convert data into electric fields uniquely, which convert plural data strings into electric field signals respectively, polarization mappers, with a function to convert an incoming electric field into an arbitrary polarization having that electric field, which convert the plural electric field signals into plural polarized electric field signals with different polarized waves as arbitrary polarizations on a circumference of a circle with a line connecting the polarized waves of the two transmission electric fields as the axis of rotation on the Poincare sphere, a polarization multiplexer which multiplexes the plural polarized electric field signals into a multiplexed polarized electric field signal, a polarization demultiplexer which demultiplexes the multiplexed polarized electric field signal into electric field signals with two polarized wave components consistent with the polarized waves of the two transmission electric fields, and two drive signal generators which drive the two electric field modulators respectively so that the electric field signals with two polarized wave components from the polarization demultiplexer are consistent with the transmission electric fields modulated by the two electric field modulators respectively.

According to the twelfth embodiment of the invention, for example, there is provided a polarization multiplexing transmitter which includes:

an orthogonal polarization multiplexing transmitter having an orthogonally polarized signal generator which generates two transmission electric fields with different polarized waves, two electric field modulators which modulate the amplitudes and/or phases of the two transmission electric fields, and a polarization multiplexer which multiplexes two transmission electric fields emitted from the two electric field modulators and outputs a single polarization-multiplexed signal; and an electric field modulator driver having a data string alternation device which alternates two incoming data strings cyclically and outputs two alternate data strings, two electric field mappers, with a function to convert data into electric fields uniquely, which convert the two alternate data strings into electric field signals respectively, and two drive signal generators which drive the two electric field modulators so that the two electric field signals from the electric field mappers are consistent with the transmission electric fields modulated by the two electric field modulators.

According to the thirteen embodiment of the invention, for example, there is provided a transmission system which includes:

a polarization multiplexing transmitter according to any of the first to eleventh embodiments which outputs a polarization-multiplexed signal with a polarized wave so rotated as to cancel a polarization fluctuation in a transmission path, a transmission path polarization monitor which detects a polarization fluctuation or its residual, or the amount of dependence thereon, and a polarization management device which drives the polarization multiplexing transmitter based on the amount detected by the transmission path polarization monitor.

According to the fourteenth embodiment of the invention, for example, there is provided a wavelength multiplexing transmission system which multiplexes transmission signals from polarization multiplexing transmitters according to any of the first to eleventh embodiments and a transmission signal from a transmitter which does not modulate the polarized wave of a transmission signal, in which a polarization scrambling management device manages and controls the polarization scrambling pattern and/or speed of the polarization multiplexing transmitters with different wavelength channels so that the polarization scrambling patterns and/or speeds of polarization multiplexing transmitters with adjacent wavelength channels among those transmitters do not coincide with each other.

According to the above embodiments, it is possible to use an orthogonal polarization multiplexing transmitter so as to generate a polarization-scrambled optical signal without newly adding a polarization modulator or polarization scrambler to an optical transmitter. Particularly, it is also possible to generate polarization-scrambled polarization multiplexed signal. In addition, since no additional polarization modulator nor polarization scrambler is required, the equipment cost and size can be reduced.

The polarization scrambling speed, cycle, timing and/or pattern of an optical signal emitted from an optical transmitter can be as desired. Particularly, the polarization scrambling speed can be a desired speed not higher than the modulation speed of an optical signal.

What is claimed is:

1. A polarization multiplexing transmitter comprising:
an orthogonal polarization multiplexing transmitter including:
an orthogonally polarized signal generator which generates two transmission electric fields with mutually orthogonal polarized waves;
two electric field modulators which modulate amplitudes and/or phases of the two transmission electric fields respectively; and
a polarization multiplexer which multiplexes two transmission electric field signals modulated by the two electric field modulators and outputs a single polarization-multiplexed signal;
a polarization-rotated electric field generator which outputs, for a plurality of data strings, a plurality of polarization-rotated electric field signals having data on different polarized waves rotating on a Poincare sphere and electric field data corresponding to the data strings; and
an electric field modulator driver which multiplexes the polarization-rotated electric field signals into a single multiplexed polarized electric field signal, demultiplexes the multiplexed polarized electric field signal into polarized wave components of the two transmission electric fields generated by the orthogonally polarized signal generator and outputs two polarized demultiplexed electric field signals, and drives the two electric field modulators based on the two polarized demultiplexed electric field signals respectively.

2. The polarization multiplexing transmitter according to claim 1, wherein the two transmission electric fields generated by the orthogonally polarized signal generator are two optical signals and the two electric field modulators are two optical modulators which modulate amplitudes and/or phases of the two optical signals respectively.

3. The polarization multiplexing transmitter according to claim 1, wherein the electric field modulator driver includes:
- a plurality of electric field mappers, with a function to convert data into electric fields uniquely, which convert a plurality of data strings into electric field signals respectively;
- a plurality of polarization mappers, with a function to convert an incoming electric field into an arbitrary polarization having that electric field, which convert the plural electric field signals from the electric field mappers into polarized electric field signals with desired polarized waves respectively;
- a plurality of polarization rotators which rotate polarized waves of the plural polarized electric field signals respectively,
- a polarization rotation controller which controls the polarization rotators;
- a polarization multiplexer which multiplexes the polarized electric field signals from the polarization rotators into a multiplexed polarized electric field signal;
- a polarization demultiplexer which demultiplexes the multiplexed polarized electric field signal into two polarized wave components of the two transmission electric fields generated by the orthogonally polarized signal generator and outputs two polarized demultiplexed electric field signals; and
- two drive signal generators which drive the two electric field modulators respectively so that the two polarized demultiplexed electric field signals from the polarization demultiplexer are consistent with transmission electric field signals from the two electric field modulators.

4. The polarization multiplexing transmitter according to claim 3, wherein the two field modulation processors perform modulation so that a group of electric field signals of incoming electric field signals are consistent with a group of electric field symbols of outgoing electric field signals.

5. The polarization multiplexing transmitter according to claim 1, wherein amplitudes and/or phases of all the polarization-rotated electric field signals are each modulated independently and polarized waves of all the polarization-rotated electric field signals are modulated on the Poincare sphere uniformly.

6. The polarization multiplexing transmitter according to claim 5, wherein the electric field modulator driver includes:
- a plurality of electric field mappers, with a function to convert data into electric fields uniquely, which convert a plurality of data strings into electric field signals respectively;
- polarization mappers, with a function to convert an incoming electric field into an arbitrary polarization having that electric field, which convert the plural electric field signals into a plurality of polarized electric field signals with desired polarized waves respectively;
- a plurality of polarization rotators which rotate polarized waves of the plural polarized electric field signals respectively;
- a polarization rotation controller which synchronizes the polarization rotators and drives the polarization rotators so as to rotate incoming polarized waves uniformly and cyclically on the Poincare sphere;
- a polarization multiplexer which multiplexes the polarized electric field signals from the polarization rotators into a multiplexed polarized electric field signal;
- a polarization demultiplexer which demultiplexes the multiplexed polarized electric field signal into polarized wave components of the two transmission electric fields generated by the orthogonally polarized signal generator and outputs polarized demultiplexed electric field signals; and
- two drive signal generators which drive the two electric field modulators respectively so that the two polarized demultiplexed electric field signals are consistent with transmission electric field signals from the two electric field modulators of the orthogonal polarization multiplexing transmitter.

7. The polarization multiplexing transmitter according to claim 5, wherein the electric field modulator driver includes:
- a plurality of electric field mappers, with a function to convert data into electric fields uniquely, which convert a plurality of data strings into electric field signals respectively;
- polarization mappers, with a function to convert an incoming electric field into an arbitrary polarization having that electric field, which convert the plural electric field signals into a plurality of polarized electric field signals with desired polarized waves respectively;
- a polarization multiplexer which multiplexes the polarized electric field signals into a multiplexed polarized electric field signal;
- a polarization rotator which rotates a polarized wave of the multiplexed polarized electric field signal;
- a polarization rotation controller which drives the polarization rotator so as to rotate an incoming polarized wave cyclically;
- a polarization demultiplexer which demultiplexes the multiplexed polarized electric field signal from the polarization rotator into polarized wave components of the two transmission electric fields generated by the orthogonally polarized signal generator and outputs two polarized demultiplexed electric field signals; and
- two drive signal generators which drive the two electric field modulators respectively so that the two polarized demultiplexed electric field signals are consistent with transmission electric field signals from the two electric field modulators of the orthogonal polarization multiplexing transmitter.

8. The polarization multiplexing transmitter according to claim 5, wherein all of the cycles of polarized waves rotating of all the polarization-rotated electric field signals are the same as each other; and the least common of the cycles of polarized waves rotating and amplitudes and/or phases modulation of all the polarization-rotated electric fields is set to be smaller than a predetermined threshold.

9. The polarization multiplexing transmitter according to claim 5, wherein the electric field modulator driver includes:
- a plurality of electric field mappers, with a function to convert data into electric fields uniquely, which convert a plurality of data strings into electric field signals respectively;
- a plurality of polarization mappers, with a function to convert an incoming electric field into an arbitrary polarization having that electric field, which convert the plural electric field signals into polarized electric field signals with arbitrary polarizations on a circumference of a circle with an axis connecting the polarized waves of the two transmission electric fields as an axis of rotation on the Poincare sphere,
- a polarization multiplexer which multiplexes the polarized electric field signals and outputs a single multiplexed polarized electric field signal;
- a polarization demultiplexer which demultiplexes the multiplexed polarized electric field signal into polarized wave components of the two transmission electric fields and outputs polarized demultiplexed transmission electric field signals;
two electric field modulation processors which modulate an amplitude ratio and/or phase difference between the two polarized demultiplexed electric field signals;
an electric field modulation controller which drives the electric field modulator; and
two drive signal generators which drive the two electric field modulators so that the output fields from the two electric field modulation processors are consistent with the two transmission electric fields modulated by the two electric field modulators.

10. The polarization multiplexing transmitter according to claim 5, wherein the electric field modulator driver includes:
two electric field mappers, with a function to convert data into electric fields uniquely, which convert two data strings into electric field signals respectively;
electric field modulation processors which modulate a phase difference between the two electric field signals;
an electric field modulation controller which drives the electric field modulation processors; and
two drive signal generators which drive the two electric field modulators respectively so that the two electric field signals modulated by the electric field modulation processors are consistent with the transmission electric fields modulated by the electric field modulators.

11. The polarization multiplexing transmitter according to claim 5, wherein a polarization rotation pattern is limited in rotation of polarized waves of polarized electric field signals.

12. The polarization multiplexing transmitter according to claim 1, comprising:
an electric field modulator driver including:
a data string alternation device which alternates two incoming data strings cyclically and outputs two alternate data strings;
two electric field mappers, with a function to convert data into electric fields uniquely, which convert the two alternate data strings into electric field signals respectively; and
two drive signal generators which drive the electric field modulators so that the two electric field signals from the electric field mappers are consistent with the transmission electric fields modulated by the electric field modulators.

13. The polarization multiplexing transmitter according to claim 1, comprising:
an electric field modulator driver including:
two electric field mappers, with a function to convert data into electric fields uniquely, which convert two incoming data strings into electric field signals respectively;
an electric field signal alternation device which alternates two incoming electric field signals cyclically and outputs two alternate electric field signals; and
two drive signal generators which drive the two electric field modulators so that the two alternate electric field signals from the electric field signal alternation device are consistent with the transmission electric fields modulated by the two electric field modulators.

14. A transmission system comprising:
a polarization multiplexing transmitter according to claim 1;
a transmission path polarization monitor which detects a polarization fluctuation in a transmission path from the polarization multiplexing transmitter to a receiver or its residual, or an amount of dependence thereon; and
a polarization management device which drives the polarization multiplexing transmitter based on the amount detected by the transmission path polarization monitor,
wherein the polarization multiplexing transmitter outputs a polarization-multiplexed signal with a polarized wave so rotated as to cancel a polarization fluctuation in the transmission path.

15. A transmission system comprising: a plurality of polarization multiplexing transmitters according to claim 1; and at least one polarization-uncontrolled transmitter which outputs a non-polarization scrambled transmission signal, wherein the polarization multiplexing transmitters and the polarization-uncontrolled transmitter include a transmitting module with different wavelength channels and a polarization scrambling management device which controls polarization scrambling patterns and/or speeds of all the polarization multiplexing transmitters so that in the different wavelength channels of all the polarization multiplexing transmitters, polarization scrambling patterns and/or speeds of the polarization multiplexing transmitters with adjacent wavelength channels do not coincide with each other.

* * * * *